US012625888B2

(12) United States Patent
Ruan et al.

(10) Patent No.: US 12,625,888 B2
(45) Date of Patent: May 12, 2026

(54) METHODS AND SYSTEM FOR DETERMINING, NAVIGATING, AND PRESENTING COMPLEX RELATIONSHIPS IN CONTENT

(71) Applicant: IP.com I, LLC, Fairport, NY (US)

(72) Inventors: Wen Ruan, Boxborough, MA (US); Joseph Anthony Manico, Rochester, NY (US); William Yurich Fowlkes, Pittsford, NY (US); Young No, West Henrietta, NY (US)

(73) Assignee: IP.com I, LLC, Fairport, NY (US)

( * ) Notice: Subject to any disclaimer, the term of this patent is extended or adjusted under 35 U.S.C. 154(b) by 0 days.

(21) Appl. No.: 18/913,102

(22) Filed: Oct. 11, 2024

(65) Prior Publication Data

US 2025/0124055 A1 Apr. 17, 2025

Related U.S. Application Data

(60) Provisional application No. 63/589,809, filed on Oct. 12, 2023.

(51) Int. Cl.
*G06F 16/28* (2019.01)
*G06F 16/2458* (2019.01)
(Continued)

(52) U.S. Cl.
CPC ........ *G06F 16/285* (2019.01); *G06F 16/2477* (2019.01); *G06F 16/248* (2019.01); *G06Q 50/184* (2013.01)

(58) Field of Classification Search
None
See application file for complete search history.

(56) References Cited

U.S. PATENT DOCUMENTS 9,418,083 B2 * 8/2016 Pedersen ............. G06F 16/3323
9,798,767 B1 * 10/2017 Cook ...................... G06F 40/10
(Continued)

OTHER PUBLICATIONS

Lu et al., "A novel approach to identify the major research themes and development trajectory: The case of patenting research", Technological Forecasting and Social Change, Feb. 2016, pp. 71-82, vol. 103, Elsevier Inc., https://doi.org/10.1016/j.techfore.2015.10.018.
(Continued)

*Primary Examiner* — Debbie M Le
(74) *Attorney, Agent, or Firm* — Venable LLP

(57) ABSTRACT

The present teaching relates to identifying related content and significance thereof with respect to some specified goal. Initial content is obtained based on a specified goal. Associated content is identified based on the semantics of the initial content and semantic-based temporal information. Different temporal relations are determined based on the specified goal and are extracted from content comprising the initial and associated content. With respect to each extracted temporal relation, determine a semantic analysis to be performed based on the specified goal. A summary is automatically generated for each of the semantic analysis results and is visualized to reveal semantic and temporal relations among different related content pieces. The visualization can be adjusted according to user input.

22 Claims, 27 Drawing Sheets

(51) Int. Cl.

| | |
|---|---|
| *G06F 16/248* | (2019.01) |
| *G06Q 50/08* | (2012.01) |
| *G06Q 50/18* | (2012.01) |

(56) References Cited

U.S. PATENT DOCUMENTS

| | | | | |
|---|---|---|---|---|
| 9,846,694 | B1 * | 12/2017 | Cook ...................... | G06F 16/93 |
| 9,858,319 | B2 * | 1/2018 | Lundberg .......... | G06F 16/24578 |
| 9,910,899 | B1 * | 3/2018 | Fields ................... | G06Q 10/10 |
| 10,262,028 | B2 * | 4/2019 | Grune ................... | G06F 16/245 |
| 11,232,383 | B1 * | 1/2022 | Burns, Sr. .......... | G06Q 10/0637 |
| 11,379,887 | B2 * | 7/2022 | Fleischman ........ | G06Q 30/0278 |
| 12,430,508 | B2 * | 9/2025 | Glesinger ................ | G06N 3/08 |
| 2009/0043797 | A1 * | 2/2009 | Dorie ................... | G06F 16/355 |
| | | | | 707/999.102 |
| 2012/0290487 | A1 * | 11/2012 | Lee ...................... | G06Q 50/184 |
| | | | | 705/310 |

OTHER PUBLICATIONS

Hwang et al., "Extending technological trajectories to latest technological changes by overcoming time lags", Technological Forecasting and Social Change, Jun. 2019, pp. 142-153, vol. 143, Elsevier Inc., https://doi.org/10.1016/j.techfore.2019.04.013.

Verspagen, "Mapping Technological Trajectories as Patent Citation Networks: A Study on the History of Fuel Cell Research", Advances in Complex Systems, 2007, pp. 93-115, vol. 10, No. 01, World Scientific Publishing Co Pte Ltd, https://doi.org/10.1142/S0219525907000945.

* cited by examiner

Semantic
relations

Related
docs

Temporal
relations

Other
Relations
(e.g., procedural/
geographical/
combinational
relations)

Content S&T Analytics
Service Engine 140

New content
created via semantic
analysis

100

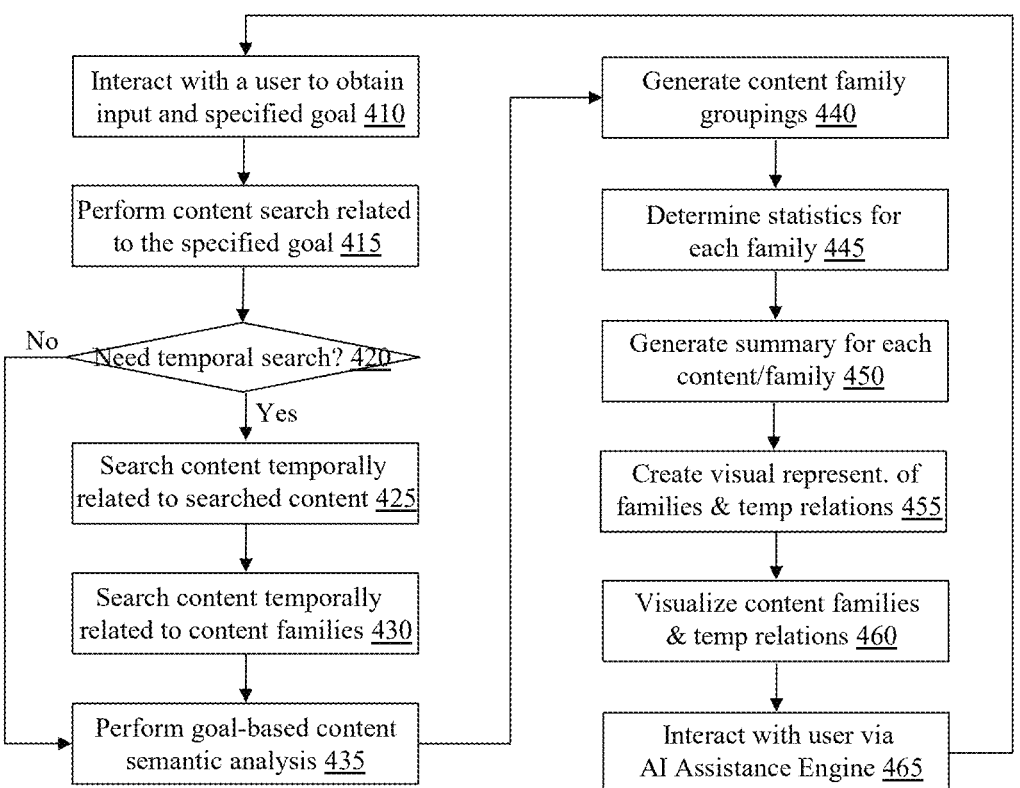

Interact with a user to obtain
input and specified goal 410

Perform content search related
to the specified goal 415

No ◁ Need temporal search? 420 ▷

Yes

Search content temporally
related to searched content 425

Search content temporally
related to content families 430

Perform goal-based content
semantic analysis 435

Generate content family
groupings 440

Determine statistics for
each family 445

Generate summary for each
content/family 450

Create visual represent. of
families & temp relations 455

Visualize content families
& temp relations 460

Interact with user via
AI Assistance Engine 465

METHODS AND SYSTEM FOR DETERMINING, NAVIGATING, AND PRESENTING COMPLEX RELATIONSHIPS IN CONTENT

CROSS REFERENCE TO RELATED APPLICATION

The present application claims the benefit and priority of U.S. Provisional Patent Application No. 63/589,809, filed on Oct. 12, 2023, entitled "METHODS AND SYSTEM FOR DETERMINING, NAVIGATING, AND PRESENTING COMPLEX RELATIONSHIPS IN CONTENT", the contents of which are hereby incorporated by reference in its entirety.

BACKGROUND

1. Technical Field

The present teaching generally relates to data processing. More specifically, the present teaching relates to artificial intelligence (AI) based data processing and applications thereof.

2. Technical Background

Identifying document(s) of interest from a large collection of documents can be a laborious, subjective, and potentially inaccurate process. Even when the data set is reduced or narrowed by various search strategies to a smaller data set, it is still tedious to read through the documents and understand the content of each document and relationships between each other with subjectivity and inaccuracy. When it comes to analyzing a technology field or a large company's portfolio, it is inevitable to deal with a fairly large number of documents that will be difficult to review them manually. Identifying the most critical documents in a data set and determining what they reveal is a problem that needs to be solved for many applications, which include but are not limited to competitive intelligence analytics, due diligence for business transactions such as a merger and acquisition (M&A) or in capital investment, new product development, and patent related operations such as prior art search, patentability study, patent prosecution/maintenance, freedom to operate study, invalidity/infringement analysis, etc.

This situation may be exacerbated in patent related applications due to large amount of related collections, cross-referenced patent families that may include hundreds of individual family members, related patent applications such as co-filed or cross-referenced applications, continuations, divisionals, continuations-in-part, and patents/patent applications linked via terminal disclaimers or regulatory extensions. Individual patents/patent applications and those within large patent families may also have hundreds of forward, backward, or horizontal/cross citations with varying degrees of relevance to each other.

Some documents may be related in some fashion, such as via some temporal relations, procedural relations, semantic relations. Citations may be another type of relation that may be used to link different documents. Citations exist in many types of documents, e.g., scientific literature, technical and product documents, webpages, patent documents, etc., and are used to establish some kind of relevance beyond temporal relationships between documents, assuming that only related works are referenced. Conventionally, empirically derived citation network diagrams may capture temporal relationships between a document of interest and its citations in both directions, but such diagrams do not recognize the level of relevance that may exhibit in reality. For example, an inventor may cite numerous patents of dubious relevance that a patent practitioner must review manually to identify the most relevant cited patents. On the other hand, not all relevant or related documents are cited by a document due to various limits. A highly relevant patent may not be cited by an inventor or by an examiner which could pose a potential challenge as to the validity of the patent. Besides relevance, a conventional citation analysis, e.g., the main path or key route analysis which solely focuses on various link traversal frequencies, may also overlook the quality of the document itself.

Individual patent documents within a patent family may have an original parent patent with hundreds of pages of specification and numerous divisionals, continuations, and continuation-in-part (CIP) with very similar if not identical specifications. The children of the parent patent application may have claim sets covering different protection scopes directed to various alternative embodiments and specialized features derived from the text and illustrations of the parent specification. With conventional methods, individual claim sets and possibly their supporting specifications need to be reviewed to determine the relevance to a patent of interest, a patent portfolio, a product, a service, or some inventive concepts, which again can be a laborious task.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4 depicts an exemplary workflow of the content S&T analytics service engine, in accordance with an embodiment of the present teaching;

DETAILED DESCRIPTION

Figure 1A:
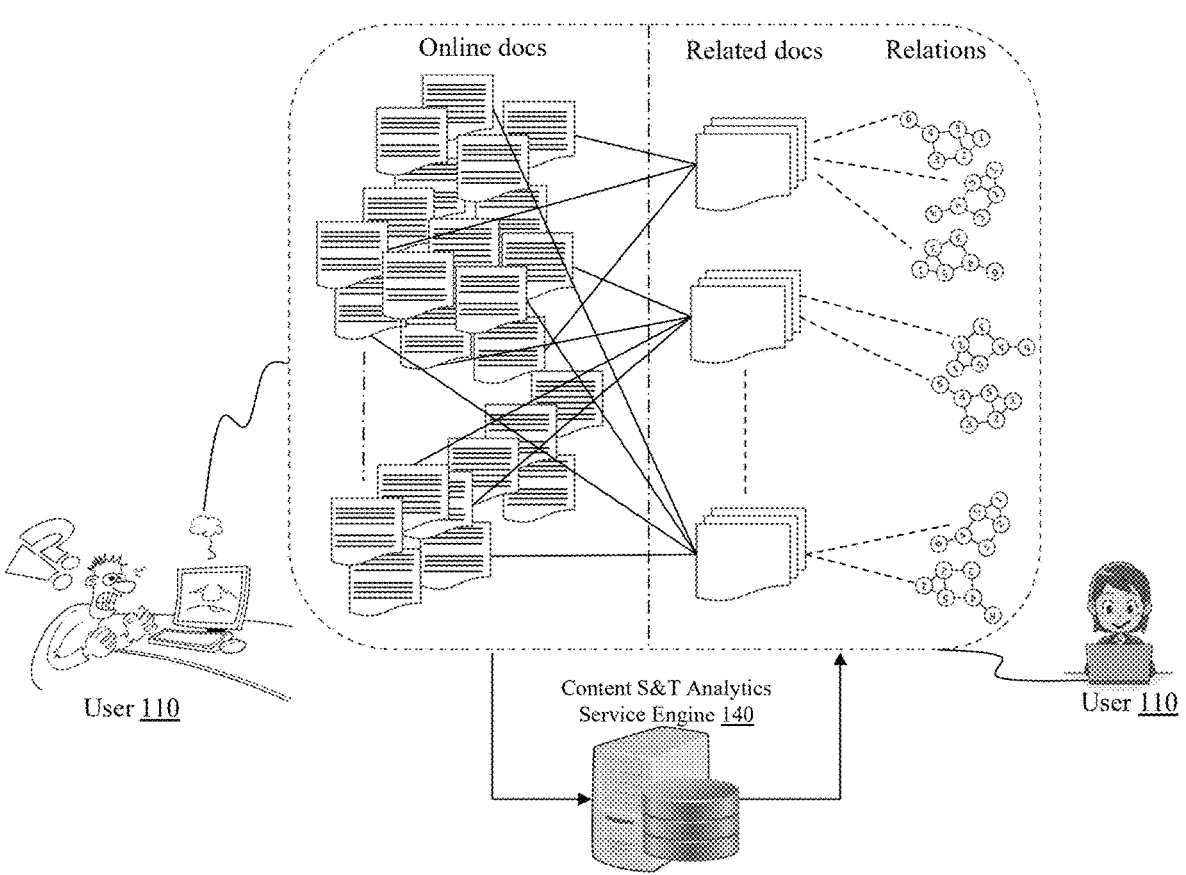
FIG. 1A illustrates contrasting situations between having to deal with a pile of unorganized documents as opposed to accessing documents organized based on different meaningful relations created by a content semantic and temporal (S&T) analytics service engine, in accordance with an embodiment of the present teaching.

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or algorithms have been described at a relatively high-level, without detail, in order to avoid unnecessarily obscuring aspects of the present teachings.

The present teaching aims to address the deficiencies of the current state of the art and discloses an integrated artificial intelligence (AI) based system and method for providing content semantic analytics, temporal relationship analytics, corresponding summary and visualization of analytic results, and interactive user interfaces for various applications to fulfill user's needs. Content may correspond to textual content that natural language techniques and semantic analysis can be applied thereto. Such textual content may also be converted from audio or video clips using speech to text techniques, image understanding techniques, and other AI based technologies so that semantics thereof may be preserved for further analysis.

Semantics of content may be leveraged to find semantically similar content and further define semantic distances or similarities between different pieces of content, i.e., documents in case of textual content. Individual documents may be placed along the semantic dimension based on the semantic distance between the content. Semantics along with other data associated with the content such as metadata may be combined to derive additional information to characterize the strength or quality of the content. The time that each content was published and the time it was referenced, i.e., cited, by other content may provide an implicit temporal relationship between the two where the early published content was cited by a later published content and they are somewhat related because of the presence of the citation. Semantic analysis that may be carried out on a document may be automatically determined based on, the nature or type, of relations between the document and another related document. The semantic and temporal relationships between each content may be visualized in a 2D space where X and Y axes may represent time span and semantic distance, respectively. Additional dimensions could be added based on the quality of the content and additional metadata.

An AI based solution assistant may learn (e.g., from the content tracked and collected from various objectives, processed user interactions) semantic and temporal relationship analytics of relevant prior art and generate suggestions, summaries and reports with regard to an objective (such as understanding the technologies of a selected company or industry for different business purposes such as M&A, competitive intelligence, etc.). In one embodiment, a generative AI based on Large Language Models (LLMs) may be used to learn from the content presented to the user and the user's follow up interaction sequences directly, and synthesized text and language based user prompts created according to user's instruction, e.g., revise, summarize, classify, or automatically generate attorney ready patent disclosures from user input text, etc. LLMs may include but are not limited to transformer based models such as BERT (Bidirectional Encoder Representations from Transformers) by Google, GPT-3/4 (Generative Pretrained Transformers) by OpenAI, Llama (Large Language Model Meta AI) by Meta, and transformer based models trained using patent data, Wikipedia, and other selected content. In some embodiments, off-the-shelf LLMs may be used to handle general conversional interactions with user. In other embodiments, customized LLMs may be obtained using content, e.g., chosen by the user relevant to an application in hand, e.g., data analytics on patent documents. Any generative LLM may be integrated with the content semantic and temporal relationship analytics service disclosed in the present teaching to assist with communicating with the user.

A product based on generative AI may also be deployed to assist to interact with technical personnel to overcome the "blank page" obstacle that some inventors and engineers may experience in an effort to document their ideas by, e.g., providing relevant prompt as a starting point and can also be used to synthesize real time interactions with users in the form of audio and text-based chat and animated avatars. Generative AI can also be relied on in a product used to assist with editing drafts, fixing run-on sentences, generating diagrams and suggesting unique acronyms.

FIG. 1A illustrates two contrasting situations in document management and data mining. One situation is shown on the left and the other is on the right in FIG. 1A. In the former case on the left, a user 110 would face a pile of unorganized documents, e.g., various online documents gathered from different sources, which may be available for keyword search, but would be hard for the user to quickly grasp what content were included in the pile and relationships thereof. In addition, although keywords are used for searching for content, there is no mechanism to ensure that other related documents may also be revealed during the keyword based search. After the content were processed by a content S&T analytics service engine 140 in accordance with an embodiment of the present teaching, groups of related documents may be automatically identified and organized by meaningful relations and presented to a user for quick view of the content covered. The user may find the group of content of interest and further drill down to related content based on the relation of interest.

Figure 1B:
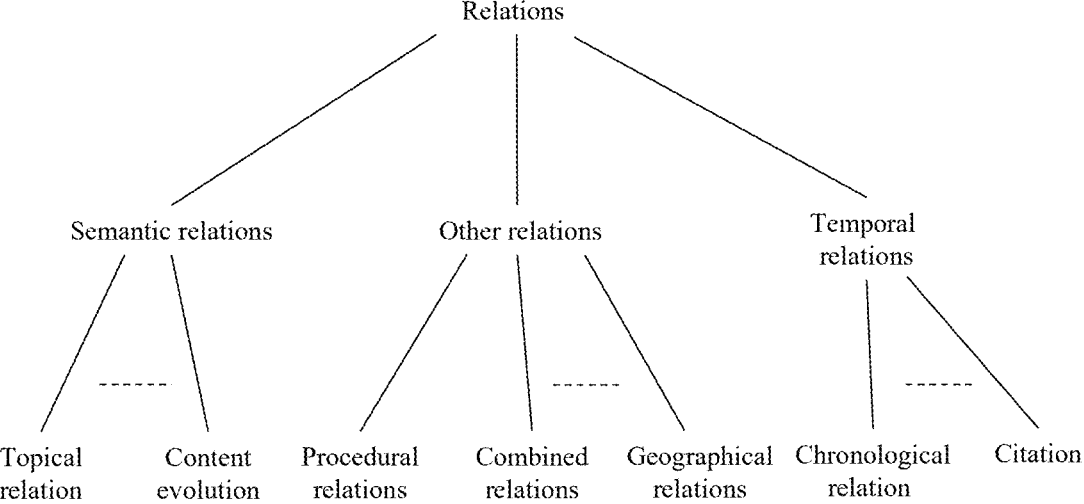
FIG. 1B illustrates exemplary types of relationships that may be identified and utilized by a content S&T analytics service engine to identify related documents and organize them in meaningful ways, in accordance with an embodiment of the present teaching.

FIG. 1B illustrates exemplary types of relationships that may be identified and utilized by the content S&T analytics service engine 140 to identify related documents and organize them in meaningful ways based on the relations, in accordance with an embodiment of the present teaching. A typical semantic relation may be topical relation, where content may be grouped by topics. Similar topics may be grouped together based on some kind of semantic distance defined by a semantic model learned from data such as the Semantic Gist model or based on known relationships which may be common knowledge or defined by taxonomies or ontologies. For example, a broad abstract concept may be further refined to more detailed narrow concepts, which may be leveraged by the content S&T analytics service engine 140 to find more related documents covering detailed aspects of a broad concept. Content evolution may be another example of semantic relations that can be used by the content S&T analytics engine 140 to organize revisions of the same content and identify changes from revision to revision. For example, a scientific paper may be initially submitted to arXiv (https://arxiv.org/), an open-access archive for scholarly articles covering many scientific and engineering fields, to get an early time stamp and/or get feedback from peers, which may then be published in conference proceedings and/or scientific journals with or without modifications. Similarly, business and/or product documents within an enterprise often need to go through multiple revisions by multiple persons and end up with multiple revisions sitting on a shared drive to complicate the discovery process if a user would like to locate a specific version. For example, if a user would like to find out the revision where a new feature was first introduced to the document and how it evolved, then the content S&T analytics service engine 140 may need to identify the revisions containing the new feature leveraging the content evolution relation and the chronological order of the revisions via the temporal relations, and perform semantic analysis to find out when the new feature first occurred in a revision and the evolution of the feature in the document. Chronological relation, which is the connection between events in time, and citation, which is a direct reference, also fall under the temporal relations since the time of occurrence is implied in these two relationships. For example, only patents with earlier priority dates could be used to knock out a patent application or invalidate a patent with a later priority date. Besides references in scientific literature, technical documents, and patent applications and grants, links between webpages or other online media including implicit links extracted from content, e.g., based on mention, may also be treated as a type of citation.

Other relations such as procedural relations, combined relations and geographical relations may also be leveraged by the content S&T analytics service engine 140 to organize content by different dimensions. Procedural relations may be included in finding other documents related to each other due to procedural relations even though on its face, they may not appear related. For example, a case may be either refiled or transferred from a state court to a federal court. They are independently filed cases, but they are procedurally related. As another example, combined relation may be used to identify documents related at different jurisdictions. A patent litigation may trigger an inter parts review (IPR) proceeding even though the court case and the IPR proceeding may not have an explicit linkage that can be followed. In this case, the combined relationship may be defined based on domain knowledge in patent litigation so that it may be used to look for related documents that otherwise would be difficult to identify. In a technical context, a large system may be achieved by combining multiple subsystems each associated with dedicated product description documents and installation instruction documents. The installation instructions of the subsystems may be organized following installation procedure, and the subsystem description documents may be organized as components of the larger system. In another example, SBIR (Small Business Innovation Research) proposals may include phase I, phase II, and phrase III proposals, which certainly occurred in a chronological order. But there are also procedural relation and chorological relation between phased SBIR proposals because the phase II and phrase III proposals can only be submitted if the previous phrase proposal was awarded and completed.

Figure 1C:
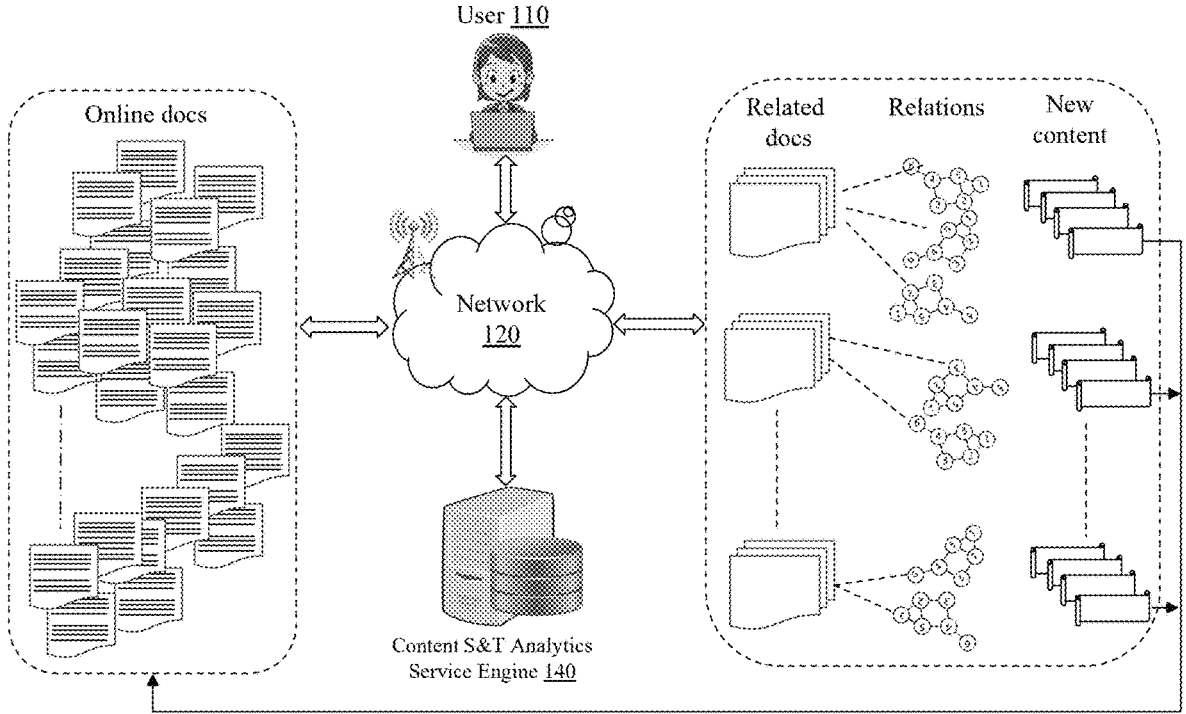
FIG. 1C illustrates a content S&T analytics service engine configured to create new content based on data analytics performed according to the relationships among documents to reveal the substance associated with related documents, in accordance with an embodiment of the present teaching.

FIG. 1C illustrates another exemplary feature of the content S&T analytics service engine 140 to explore the nuance (new content) among related documents that is generally not obvious to do, in accordance with an embodiment of the present teaching. For example, in some situations, interesting revelation from related documents may depend on how the two documents are related. For example, two patents may be related if one of them matured from a patent application filed as a continuation application of the other patent. In this case, as the two documents are related as parent and continuation child patents, a question about these two documents under this relationship may be, e.g., the distinct subject matters protected by each of the two patents. With this question, semantic analysis may be performed with the aim of answering this question arising from the specific relation between the two. Assume that the same parent patent is also related to another patent that is a continuation-in-part (CIP) of the parent patent. In this case, the nature of the relationship (the second patent is a CIP of the parent patent) determines that there must be some additional improvement patented by the CIP patent. In this case, semantic analysis may be performed to answer the question what constitutes the additional improvement found in the CIP patent. It is clear that this latter semantic analysis for identifying additional improvement cannot be applied to the first situation (continuation patent). That is, the questions that may be asked may depend on the nature of the relation that link the parent and the child patents.

According to the present teaching, the content S&T analytics service engine 140 further performs semantic data analytics according to the relationship between documents identified within a group of related documents automatically, and then creates new content summarizing the substance associated with identified relations. The new content created may be made available online for search, visualization and additional analytics needs depending on the analytics goal of the user 110. For example, an SBIR project that has completed three phrases implies that it is probably commercialization ready. A summary of the SBIR project progress may be generated automatically to facilitate the user who is looking for commercialization opportunities. An example in the patent space may be the continuation decision on a pending application. By comparing a family of patent documents already filed and/or granted, a new content may be created summarizing unclaimed inventions disclosed in the specification, which may be candidates for continuation applications.

Figure 1D:
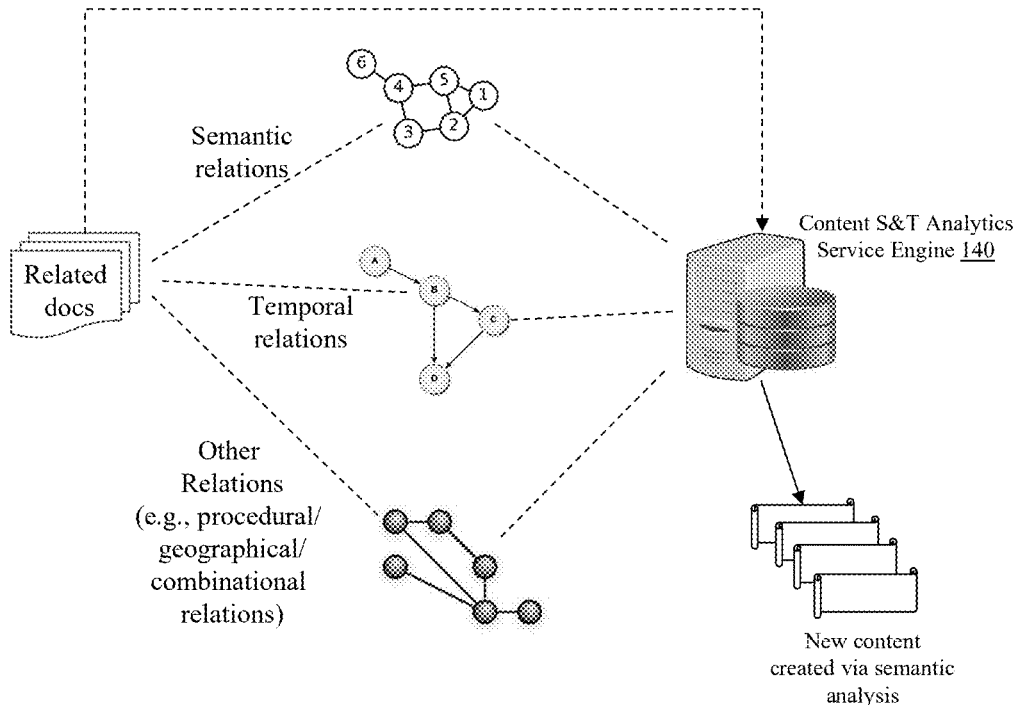
FIG. 1D illustrates the concept that related documents may be analyzed in accordance with type(s) of relations among the related documents in order to create new content capturing the connections among different documents, in accordance with an embodiment of the present teaching.

As discussed herein, different types of semantic analysis may be selectively performed according to the type and nature of the relationships existing between related documents. FIG. 1D further illustrates how related documents may be analyzed in accordance with type(s) of relations identified among the related documents and new content may be created to describe the connections among different documents. For example, related documents may include a parent patent and a CIP patent application identified based on procedural relation (the child application is filed with USPTO as a CIP). Given this relation, the semantic analysis may focus on identifying the in-part invention and new content may be created summarizing the additional invention made in CIP based on the invention claimed in the parent application. If the related documents are SBIR proposals submitted by the same entity for the same topic as in the previous example, the semantic analysis may focus on the new ideas added from phrase to phase and new content may be created summarizing the improvements and progresses made during each phase and its overall commercialization readiness. If the related documents include SBIR proposals submitted by multiple entities for the same topic, then the content S&T analytics service engine 140 may follow the ownership relation to find other submissions of each entity in the related documents, i.e., another example of the combined relation, and the semantic analysis may focus on the topic areas of the submissions of each entity, the expertise associated with each entity, etc. New content may be created summarizing the technology strength of each entity and the success rate, etc.

Figure 1F:
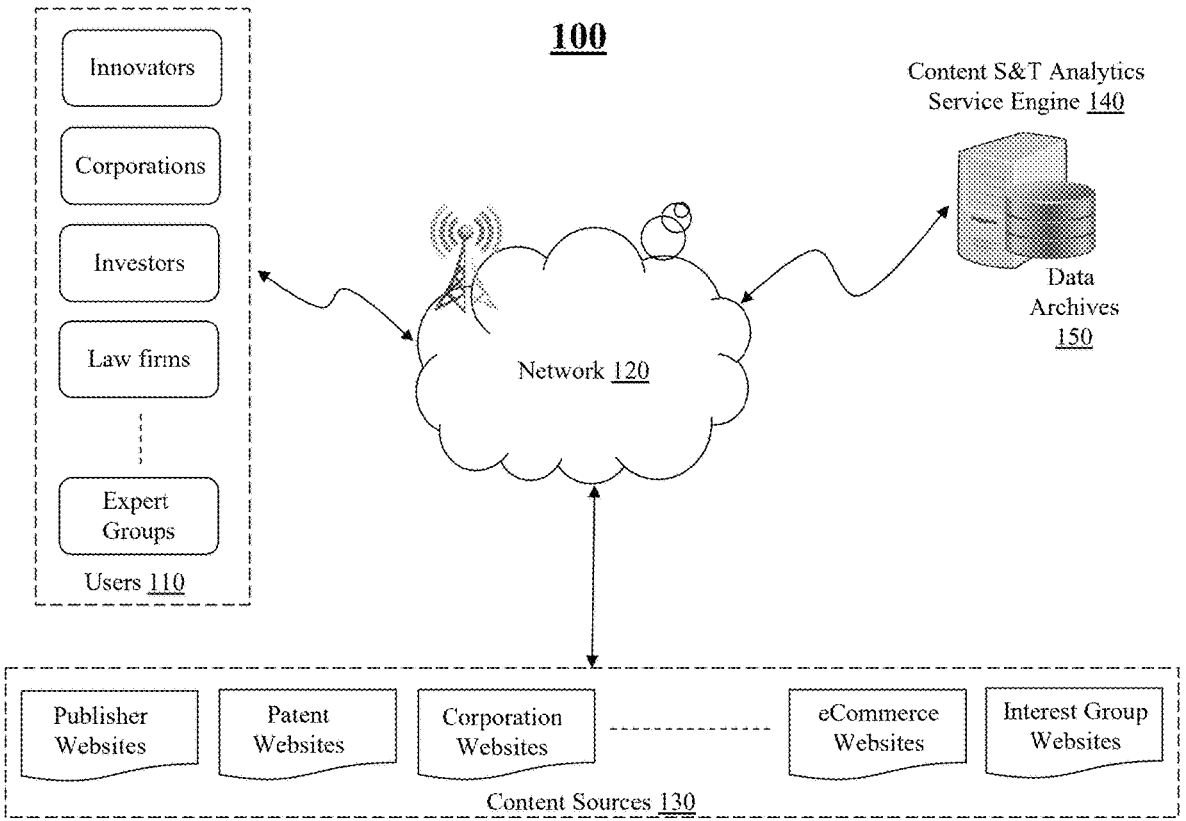
FIG. 1F illustrates a use case of the content S&T analytics service for IP related documents management and data mining, in accordance with an embodiment of the present teaching.

FIG. 1F illustrates a general framework 100 for providing a content semantic and temporal analytics service in a use case on managing and data mining IP documents, in accordance with an embodiment of the present teaching. In this framework 100, the content semantic & temporal (S&T) analytics service engine 140 may be deployed and connected to various types of service users 110 via a network 120 to provide a variety of types of services, as will be discussed below. In some embodiments, the content S&T analytics service engine 140 may have archives 150 for storing content for data analytics. In some embodiments, in addition to the internal data archives 150, the content S&T analytics service engine 140 may also be connected to external content sources 130 to acquire content via the network 120.

In this illustrated framework 100, users 110 of the content S&T analytics service engine 140 may be individuals such as innovators, researchers, investors, experts in different interest groups, or corporations, research institutions, law firms, and other organizations. Different users 110 may use services from the content S&T analytics service engine 140 related to intellectual properties (IP) and non-IP depending on their goals.

In the illustrated framework 100, a user may be an innovator who may utilize the services proffered by the content S&T analytics service engine 140 for different purposes. For example, an individual inventor may seek the service from the content S&T analytics service engine 140 to identify relevant prior art related to a new idea, or solutions to a technical problem from scientific literature, product description documents, webpages, patent applications and granted patents, and any other information that can be found on the Web or in deep databases, and further understand the development of the prior art over time and their impact to the field. This information may help inventors to improve their original idea or form new ideas. In another example of using the content S&T analytics service engine 140, an inventor may further identify companies that are active in the marketplace related to the ideas and are potential licensees of the inventor's intellectual properties (IP). In another example, a user may be an academic researcher or research institution who may seek the service from the content S&T analytics service engine 140 to find the most advanced development in a scientific field from technical documents and non-patent literature and their associated institutions for research collaboration, or to find industrial partners for joint development and/or licensing opportunities.

Similarly, a user may be a corporation or personnel thereof, in which case the same information obtained via the content S&T analytics service engine 140 may help the corporate user to decide whether to file a patent application for their innovation or keep it as trade secret, find potential licenses for their patent portfolio or enforce their IP rights, or find working partners from academia or industry for joint development. Companies may benefit from other services provided by the content S&T analytics service engine 140. For example, to ensure freedom to operate, a company may desire to understand the IP landscape in the marketplace and such assessment may be provided by the content S&T analytics service engine 140 based on, e.g., semantic and temporal relationship along with other metadata associated with the IP within certain technologies and markets.

In another example, a user may be an investor or an investment institution who may utilize the services of the content S&T analytics service engine 140 to identify potential investment opportunities based on assessments of different targets, e.g., a seminal technology with great influence and potential, obtained based on semantic and temporal relations and quality embedded in textual information and metadata associated with such targets. Investment institutions such as venture capital or private equity fund organizations are always looking for start-up companies to invest and have the needs to identify targets, understand the trend of an industry sector or certain technologies, and perform due diligence on other related aspects. Similarly, for each of such desired goals, certain assessment may be obtained via the content S&T analytics service engine 140 based on textual information and metadata associated with the desired goals.

In another example, a user may be a law firm which has the need to help their clients to achieve different IP related goals, ranging from patentability, patent prosecution and maintenance, freedom to operate, to patent litigation to enforce IP rights against infringers or defend their IP using the information obtained via the services from the content S&T analytics service engine 140. Other organizations such as a patent office may also benefit utilizing services offered by the content S&T analytics service engine 140 to facilitate more efficient and effective, e.g., patent application examinations.

In this illustrated framework 100, the content sources 130 may include a diverse range of sources including online sources, each of which may make different types of data available to others, which include but are not limited to textual documents, audio, video and various sensor information. In some embodiments, content sources 130 may provide information residing in various specialty databases, e.g., court records in litigation databases, or on the web, e.g., news and blogs in various format and technical papers on publisher websites, patent documents and file wrappers on patent authority websites, product and technical information in various formats on corporation websites and eCommerce websites, various technical information on interest group websites, etc. In addition, some of the content from different content sources may include certain meta information such as temporal information and other types of data associated with the content which may also be collected and analyzed by the content S&T analytics service engine 140.

Figure 2:
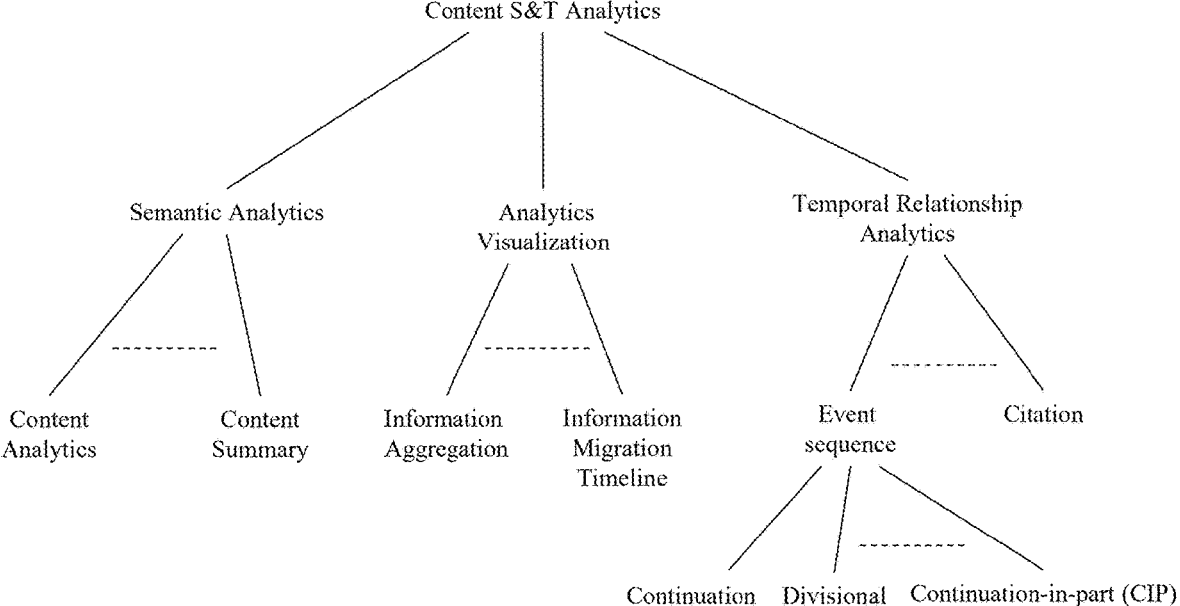
FIG. 2 illustrates exemplary types of analytics service provided by a content S&T analytics service engine in IP related documents management and data mining, in accordance with an embodiment of the present teaching.

FIG. 2 shows exemplary types of content analytics services that may be provided by the content S&T analytics service engine 140 in the use case on IP related documents management and data mining. The types of content analytics service provided by the content S&T analytics service engine 140, include but are not limited to, semantic analytics, temporal relationship analytics and analytics visualization service in accordance with one embodiment of the current teaching. Semantic analytics service may include content analytics service and content summary service, which may be combined to serve various use cases. Content analytics may include but are not limited to understanding concepts and relationships between concepts in textual content, identifying trends of topics of interest or technology development, understanding user intent and emotions during user interactions or in textual content such as news, blogs, and other social media sources, etc. Content summary may include unbiased summary based on the content itself or biased summary based on the input and user's goal. For example, if a user has a specific question about a content, the content analytics service needs to understand user's question, find the document(s) containing the answer, and then summarize the content with a focus on answering the question instead of summarizing all the important topics in the content. Topics and answers may be generated from multiple documents from multiple content sources.

The temporal relationship may be established based on the publication time of related content. One type of temporal relationship may be based on citation, e.g., prior art references in patent documents or technical documents. Another type of temporal relationship may be based on event sequence. In the patent space, one or more provisional patent applications may be filed at the same or different times before a regular patent application, and then the regular patent application may be further divided into multiple divisional applications and later result in multiple granted patents. Continuation applications of a pending parent patent application may also be filed to claim additional rights covered by the specification of the patent application. In some situations, CIP application may also be filed with some new matter added to the specification, corresponding to new improvement on the subject matter disclosed in the parent patent application. A PCT (Patent Cooperation Treaty) patent application filed at WIPO (World Intellectual Property Organization) may be national phased in different countries, e.g., in EPO (European Patent Office), JPO (Japanese Patent Office), and USPTO (US Patent and Trademark Office) respectively, each of which may be followed by additional divisional patent applications. Once a European patent application is granted, it may then be converted into national rights in different European countries, further resulting in multiple patents granted in different European states, or an EP unitary patent (which follows a different procedure though). Thus, the temporal relation analytics may reveal other different spin-off relations among different documents and such identified relations may be used by the semantic analytical engine to determine what semantic analysis may be performed to uncover corresponding relation-dependent nuances existing in different documents. For example, if the temporal relation analytics shows the group of granted patents in different patent authorities are stemmed from the same PCT application, then semantic analysis may focus on the differences of claims granted in different country or region since it means differences in patent rights.

The content S&T analytics can be applied to any set of documents selected by user or created for various goals using a variety of search technologies, e.g., a seed document used to find similar documents, a keyword or concept search used to find documents related to a technology or industry area, a search by a company, content classification code, or the like to create a portfolio to apply further semantic analytics and temporal analytics. In one embodiment, one or more temporal relationship networks may be created based on citations between documents, where each node may be one retrieved document or a group of documents and each edge reflects some kind of temporal relationship, e.g., a document cited by a later published document, with an arrow pointing from an earlier published document to a later published document. This convention corresponds intuitively to the idea of a piece of knowledge flowing from an earlier document to a later document. In a portfolio created based on relevance or other criteria, some documents may not be linked to any earlier published document, in which case either they did not cite any or their cited documents are not included in the current portfolio, thus they are considered "source" in a directed graph representing a network, i.e., zero in-links. On the other hand, some documents may not be linked to any later document in the portfolio, in which case either they were not cited by any later document or those citing documents are not in the current portfolio, thus they are considered "sink" in a directed graph, i.e., zero out-links. Source node and sink node mark the start and end point of a temporal relationship path respectively. Documents that are not linked to any earlier document nor to any later document in the portfolio due to similar reasons as "source" and "sink" nodes, are considered "isolated" and excluded in the temporal relationship path analysis. The rest of the nodes in the data set are intermediate nodes that occur in the middle of a temporal relationship path. In some cases, the temporal relationship links may create cycles and need to be resolved somehow depending on the application. Various network traversing frequency count algorithms may be applied to select the most traversing path, e.g., search path count (SPC) that simply numerates all possible search paths from start points to end points in a network and counts how often an edge lies on such a search path, search path link count (SPLC) that is similar to SPC except it treats any source or intermediate node as a start point, etc.

Temporal relationships between/among documents in the temporal relationship network may be weighted differently by different citation types. For example, scientific papers referenced by the author, by a colleague of the author, or a third-party author may be weighted differently for different analytics goals. If the goal is to understand the development of a technology within an institution, then the citation from the author and a colleague may be weighted more in the analysis. If the goal is to study the impact of a publication in a scientific field, then third party citations may be more important than citations from the author or someone from the same institution. Similarly, citations between patent documents that are provided by inventors, examiners, or third parties may also be weighted differently for different analytics goals.

Documents as nodes in the temporal relationship network may also be weighted differently for different analytics goals based on relevance and/or significance of the nodes, other meta information of the node, and the temporal relations associated with the node. The topics covered by a node may be identified and represented by topic models created by any machine learning techniques. One example may be the semantic signature generated by semantic search engines, such as IP.com's Semantic Gist™, which can be used to produce a semantic representation for each node and assess semantic similarities between the nodes. The significance of the node may be defined based on the semantic information, e.g., topic relevance and strength of the document and its associated institution, and additional information, e.g., credibility of the author and the publication channel, litigation information related to the document, the author, and the associated institution, etc. Documents published by credible websites, journals, or company websites may be weighted more than less credible sources depending on the analytics goal. In patent related analytics goals, non-practicing entity (NPE) may be weighted more in risk related analytics goals. Patents with multiple patent applications in different countries national phased via PCT may be provided with higher weights than patents without family members or national phased patents for certain analytic goals, e.g., global market penetration. Patent or patent family specific information, e.g., patent factor strength indexes derived using logistic regression on value or risk analytics, such as IP Analytics from IP.com that include overall patent strength score, litigation risk score, monetization potential score, patent quality score, and new technology value score, can be used in representing the significance of the node and influence the temporal relationship path selection.

Depending on the analytics goal, a weight may be calculated and assigned to each extracted path from the temporal relationship network based on the weight on the nodes and edges along the path. Some significant temporal relationship paths (e.g., that show a temporal progression of a topic since its initial publication to later developments by various authors connected via citation along the time axis within the underlying portfolio) can be identified and prioritized using different weighting factors with respect to the nodes, representing a document or a group of documents, as well as edges, representing relationships between connected nodes. The weighting factors may include, but are not limited to, the relevance level of the citation types defined for different analytics goals, the traversal frequency of the citation path in the citation network, the significance of the nodes, and the relevance of topics covered by nodes along the path on the topics of interest. In some embodiments, such topics of interests may be specified by the user.

In addition to the weight of a path based on, e.g., the strength of the nodes and links involved in the path, the length of a path (e.g., number of nodes along the path), the start time and the end time of the path, etc. may also be considered in selecting a path of interest by a path selection algorithm. Some paths in a temporal relationship network may be interconnected at some nodes, which may be grouped in the same group of paths. Those paths or groups of paths that are not connect to other paths or groups of paths may be considered as independent paths or groups of paths. If multiple independent groups of paths exist in a portfolio, the top weighted paths from each top weighted groups of paths may be selected if the analytics goal is to understand all major technology trajectories. Depending on an analytics goal, the length of the paths or groups of paths may be weighted more and thus the longest path or group of paths may be selected as the top path or top group of paths.

Groups of paths identified in this manner may be prioritized or ranked based on the weight of the top path in each group. If a user is interested in the position of a particular document, e.g., the seed document the user used to gather relevant and related documents, and the context in the temporal relationship network, the temporal relationship paths crossing the seed documents may be prioritized before other paths. In the case of the seed document or any document of interest, the top weighted paths or groups of paths may or may not include the seed document or the document of interest based on the weighting factors defined for corresponding analytics goals. However, if the user is also trying to understand where the document of interest stands in the technology field, e.g., this document is on the main technology development path, a branch of the main path, or a standalone development path parallel with the main paths, then the temporal relationship paths crossing the document of interest, especially those linked to the top weighted paths or groups of paths may be elevated in ranking and presented to the user along with top weighted paths or groups of paths. Such information about the document of interest would be very useful for due diligence in business transactions.

Weighting Factors

Below some exemplary weighting factors that may be used to weigh edges (relations) in the temporal relationship analytics:

Citation type based:

Inventor self-citation:

This may be weighted low or ignored unless except it may be needed for company internal portfolio analysis.

Assignee self-citation

Same as the inventor self-citation.

Examiner citation/inventor self-citation

If the examiner cites prior art from the current inventor, depending on the objective, this may be weighted higher for relevance assuming a similar technical field and has overcome the examiner's scrutiny. Some inventors cite their own patents as a "matter of course" and even though they may have low or no relevance. If the examiner also cites these references, then their weighting factor may increase.

Examiner citation/assignee self-citation

If the examiner cites prior art from the current assignee, this may be like the previous inventor self-citation example.

Examiner citation/same class code

If the examiner cites prior art from the same class code, chances are that these references may be more relevant to the patent and/or concept of interest and may be weighted higher.

Examiner citation/different class codes

If the examiner cites prior art from a different class code, chances are that these references may be less relevant to the patent and/or concept of interest and may be weighted lower since the examiner had to leave the technical field to find prior art to cite.

Sequence type based:

Continuation application

The presence of a continuation patent/application is an indication of an actively managed patent family which has received additional attention of the inventor/assignee, who likely believes that the patent has potential commercial value. Depending on the objective, continuations may be weighted higher for validity analytics as it may be assumed that additional scrutiny was received from an examiner of a patent office. The early priority date of a newly issued continuation may also increase its weight if the objective for the analysis is related to an FTO. In addition, continuation patents may be viewed as more enforceable since continuation claims are likely issued years after the original priority date. Furthermore, if a patent family is still active with pending application(s), additional continuations and/or divisionals can be filed in the future with claims directed to additional subject matter(s) as supported by the specification with still the original priority date.

Divisional application

Like a continuation weighting factor, the same reasoning applies, alternative embodiments can be claimed long after the priority date.

Continuation-in-part application

Like with a continuation weighting factor, the same reasoning applies, alternative embodiments can be claimed long after the priority date. However, any claimed "new matter" would receive a new updated priority date reflecting the date of the addition of the new matter.

Reissue patent

The difference in claims between an original and its reissue patent may be analyzed to obtain meaningful interpretation for certain analytics goals, e.g., infringement with respect to a product, validity of the reissue patent, etc. Because such analysis may be crucial to a patent enforcement scenario, the weight assigned to a reissue patent may be higher.

Provisional application

Provisional application may be weighted higher because it serves as the most important foundation when it comes to providing support to granted claims and the invention date.

Terminal disclaimer

Terminal disclaimer may be weighted higher because it requires multiple patents be tied together, which may have a significant impact on whether any of the patents related via terminal disclaimers may be enforced.

The following additional exemplary weighting factors that may be considered in terms of how to weigh nodes, e.g., patents, patent families, assignees of patents, in the semantic and temporal relationship analytics:

Patent based:

Patent family size

Patents in a larger family may be weighted higher when the analytical goal is to evaluate the technological strength and values thereof.

Length of prosecution history

A longer prosecution duration may indicate that it faced more serious challenges and/or more difficulty to overcome the rejections and, hence, potential weakness of the patent.

Specification quality

Some metrics may be indicative of the quality of the specification of a patent, such as a page count, a word count, a number of figures. Higher word/page counts may indicate a broader and/or more detailed technical range.

Is the patent assignee a manufacturer or NPE?

The assignee being an NPE or not may have a significant impact on the user's intent and what it plans to do, e.g., a patent with NPE assignee may be weighted higher because it is more likely that its goal is to enforce the patent via litigation to monetize the patent.

Does the patent protect a current product or service?

If claims of a patent cover a product or a service, it may indicate that the patent is in real use and hence more important. In this case, the node representing the patent may be weighted higher. This is especially so if the goal for the analytical study is to gather business intelligence. Some online patent marking database, e.g., https://iproduct.io/app/#/public/page/home, pool information related to patent marking on different products.

Litigation status

If a patent has previously been successfully enforced, the litigated patent may potentially be worth more and may be weighted higher in different analytics objectives. Litigation data may be extracted from litigation sources such as the USPTO Litigation Database at https://www.uspto.gov/ip-policy/economic-research/research-datasets/patent-litigation-docket-reports-data.

Litigation history

Patent owner and/or NPE's may litigate a patent multiple times against different defendants, which may serve as a useful indicator in certain analytics tasks as to the value of the patent. The more times the patent is litigated against different parties, the higher the value may be associated with the patent and in this case, the node representing to the patent may be weighted higher.

Patent portfolio size and litigation history

When a patent portfolio is relatively small yet most of the patents have been litigated, it may serve as an indication that the party that has the right to enforce the patents in the portfolio may likely be an NPE.

Type of patent litigant

The type of patent litigants, e.g., manufacturers, universities, law firms, patent assertion entities (PAE), and whether they operate on the same market if they are manufacturers may reveal who is behind the litigation and the intent of the litigation, which may be used to weight patents differently depending on the objectives.

Citation statistics based:

Forward citation—reverse citations of target reference

Higher forward citation may indicate the influence of the patent on the development, and, therefore, may be used to weight patents for many objectives, e.g., business intelligence, M&A, etc.

Citation statistics (forward/backward)

Citation relevance score, citation rate over time, citation count, frequency, source, class code range, date range, etc., may be used to weight a patent depending on the user's objectives.

Citation ratio—comparison of forward and backward citation counts

Few backward citations compared to many forward citations may be an indication of potentially important and/or unique patent. Many backward citations compared to few, or no forward citations could indicate a technology becoming obsolete, an unimportant patent, or a dubious prior art search.

Citation claim relevance

Counts of independent/dependent claims, claim word count, word redundancy, claim/specification word comparison may also be useful for certain objectives and may be used as weighting factors. Lower claim word counts may indicate a broader patent coverage, higher claim word counts indicate a narrower range of coverage.

Citation family size and type

Multiple continuation and/or divisional applications and/or broad international filings may be used as weighting factors for certain objectives.

Portfolio maintenance based:

Maintenance fee payments for individual patents, patent family members, and/or assignee patent portfolios may be used to weight a group of patents or an assignee for certain analytics objectives, e.g., business intelligence, M&A, etc.

Abandonment of individual patents, abandonments rate by assignee portfolio, compared to abandonment rates by class code, abandonment rates by groups of similar relevant patents may be used to weight a group of patents or an assignee for certain analytics objectives, e.g., business intelligence, M&A, etc.

Significant temporal relationship paths identified via the temporal relation analytics may reveal relations among different documents that would otherwise be quite difficult to uncover from the data. Such identified relations may be used by the semantic analytical engine to determine what semantic analysis may be performed for certain analytic goals. For example, if a patent document is at the starting point of a significant temporal relationship path or a group of significant temporal relationship paths, i.e., branching out to several paths that lead to active development (multiple patents followed in a shorter time frame), this patent could be a good candidate for a seminal patent. The semantic analysis of a significant temporal relationship path may be focus on the core invention of this "seminal" patent and improvements by later developed patents in the path. If the "seminal" patent has branched out to multiple significant temporal relationship paths, the semantic analysis may also focus on the semantic differences among the multiple temporal relation paths to show the different direction each path may lead to. Patents in the middle of a significant temporal relationship path that branch out to multiple significant temporal relationship paths could also be a focus of the semantic analysis since they may represent major breakthroughs, i.e., milestones, in the technology development. Similarities and differences between the "seminal" patent and "milestone" patents may be compared to summarize the seminal idea and major development of the technology. Patents close in the path that focus on the development of similar technologies may be identified and grouped together. In addition, the corresponding patent owners may be identified which may indicate the entity have pursued the technology paths and NPE assessment of the entity may be needed for certain analytics goals such as patent acquisition. If two patents are related by an invalidity proceeding (e.g., an IPR proceeding), where one in the path is used as a prior art reference to invalidate the claims of the other patent, semantic analysis may include comparing the claims of one patent with the specification of the other. If the invalidity procedure between two patents in the path is conducted in front of a court (instead of in front of a patent office), and the semantic analysis may also involve identifying the outcome of the litigation from publicly accessible case docket to determine the conclusion of the case on, e.g., the enforcement status of the enforced patent(s), which may reveal technology strength covered by the patent being enforced. As a result of the semantic analytics, a summary for a significant temporal relationship path or a group of significant temporal relationship paths may be created automatically based on the temporal relationship identified in the data. The summary may be saved and/or indexed as a technology report, which may be made available for later search, review or share to other people depending on the user settings.

The results of semantic and temporal relationship analytics, i.e., node and link path augmented with information derived from analytics, may be presented using the analytics visualization services including at least information migration timeline and information aggregation service for visualization, navigation and interaction. Various link and node configurations and visualizations may be provided such as multiple branching and converging link and node sequences representing the information migration timeline within the data. Multiple link and node patterns may be identified, which illustrate different relevance relationships, based on different analytics goals, the selected granularity of the search results, changes induced by user supplied concept modifiers for search, i.e., more like and less like selected key words, phrases, and/or selected documents. Link branching and converging at nodes may be used to illustrate divergent and convergent relevance of similar and/or cited references.

The significant temporal relationship paths may be presented as 2D or 3D models and X-Y, X-Y-Z axes can optionally be used for time span and/or relevance. For better visibility and layout, a layout algorithm with link crossing minimization based on the semantic distance between the paths and time may be used to lay out the paths in a 2D or 3D space. In one embodiment of the 2D layout, where X axis may be time and Y axis may be relevance, the X coordinates of each node in the selected paths are determined by time. Therefore, the goal of the layout algorithms is to optimize the Y coordinates of each node in selected paths. The following provides a high-level description of an example of such algorithms that assign the Y coordinates of each node on each path in a group of paths. Multiple groups of paths may be stacked together in a 2D visualization area once each group has its paths laid out.

For each independent group of paths, initiate the Y coordinates for each path:

(1) Place the top weighted path in the group at the vertical center (Y axis) of a group visualization area as the main path.

(2) Take the next path in the group and find its semantic distance to the top weighted path (the main path) and place it either above or below the main path at the semantic distance along Y axis to avoid crossing with paths already placed if it does not connect to paths other than the main path. If any node in the path is already placed in any previous non-main paths, then the path may be placed on the same side of the main path with the previous path to avoid crossing.

(3) Repeat step (2) until finish placing all paths in the group.

Detect crossings in the layout and try to move the involved paths based on the local connections to minimize the number of crossings for better visibility.

In another embodiment, multiple groups of paths may be placed in a 3D visualization space where X axis may still represent time, and Y-Z plane may represent relevance of each group of paths based on the cosine similarity angle between the central path, e.g., the top weighted path, of the group and the central path of a selected central group, e.g., the group contained the top weighted path using any criteria appropriate for user's analytics goal. Similarly, the paths within each group may be represented in a 3D space based on the cosine similarity angle between each path and the central path of the group.

Other remedies may be used to improve the visibility especially when the paths crossings are unavoidable. Interactively grey out links or highlight paths depending on the user interaction may be used in some embodiments. Sometimes, multiple documents in a path may occur at the same time or closely in time, a visual magnifier effect may be used for the user to view the documents placed close to each other. Links may be represented as straight lines or curvatures for better visibility.

Additional features include but are not limited to using shape, size, color, concentric or overlapping shapes to represent meta information of a node and/or link, and using arrows to represent temporal sequence direction, i.e., the link starts at an older document and points to its forward citation, a newer document. In one embodiment, information migration timeline may be represented by X axis and relevance of each path to the main path represented by Y axis. In another embodiment, besides using X-Y axis representing time span and relevance respectively, the overlapping nodes in X-Y plane, e.g., documents in the same path published on the same date or closely on the timeline, may be represented by Z axis. In another embodiment, the significant temporal relationship paths may be optimized to better show the connections and directions of each path ignoring the length of time span. All the visualization embodiments discussed in the current teaching may be interactive and may allow reselect or redraw the significant temporal relationship paths with a new focus or additional data depending on the user action. Graphic figures may be moved, adjusted, rotated in space, interrogated, expanded, and collapsed depending on the user action.

Semantic analytics results along with additional information extracted from metadata may be consolidated by the information aggregation service and present to the user based on the user's goal. The user interaction interface provides indications of conditions involving individual patents, patent families, portfolios, assignees, and technology trends in real time during user interaction, and alerts may be set up to continue monitoring results in the backend and send to the user when specified changes occur. For example, the author and associated institution of a seminal paper of a technology field of interest may be attached to the node and presented to the user if the user is looking for partnership. Patent litigation information, if available, may be attached to the node and presented to a user, e.g., as a warning flag or an alert, if the user's goal is due diligence for merger & acquisition. The type of citation may be displayed to the user and allow user to enable or disable certain types of citations in the temporal relationship analytics depending on the goal. The meta information of nodes and edges may be presented directly on the UI or displayed when user interacts with the UI, e.g., mouse over or click a node or edge, etc.

Alerts, Warning Flags and Indicators

The discussions below provide some exemplary flags that may be used in some situations. Some conditions may raise different flags for different analytics objectives.

Potential NPE—entities with litigious portfolio and high percentage of litigated patent in the portfolio Litigious patent—patents with number of litigated cases Low relevance forward citation—a significant percentage of forward citations of a patent have low semantic relevance to the patent Claim text unsupported by specification—invalidity warning or potential section 112 rejection warning Claim text closely matches family member (>90%)—double patenting warning Succinct claim(s)—independent claims below certain word count, e.g. the average claim word count for the class code, may indicate potentially broad coverage A highly relevant (e.g., 4.8 out of 5) active patent with succinct independent claim (e.g., word count less than or equal to 27) identified for the input inventive concept may raise different flags as exemplified below for different objectives:

(a) Freedom to Use—may require licensing (b) Patentability—low (c) Patent infringement risk—high A highly relevant expired patent with succinct independent claim identified for the input inventive concept, where its 6-year statute of limitations on expired patents has elapsed, may raise, e.g., the following different flags for different objectives:

(a) Freedom to Use—likely public domain (b) Patentability—low (c) Patent infringement risk—low The highest relevant active or expired patent with low relevance score (e.g., 2.3 out of 5) and verbose independent claim (e.g., word count more than or equal to 187) identified for the input inventive concept may raise, e.g., the following different flags for different objectives:

(a) Freedom to operate—no current active or expired highly relevant patent identified (b) Patentability—high (c) Patent infringement risk—low A highly relevant patent identified with a terminal disclaimer—this patent will expire on certain date normally it is earlier than the normal expiration date.

A highly relevant patent identified with a terminal disclaimer owned by an assignee that is different from the assignee who owns additional patents linked to this terminal disclaimer, may raise different flags:

(a) Patent enforceability risk—high (b) Validity risk—high

A terminal disclaimer is filed to obviate a double patenting rejection. Patents do not need to be in the same patent family to be linked by terminal disclaimer. To enforce patents linked by a terminal disclaimer, the corporate entity that enforces any of the terminally disclaimed patents must own all such patents connected via terminal disclaimer and/or regulatory extensions.

Non-Practicing Entity Alert

Empirical factors may be used to assess if a current assignee is a Non-Practicing Entities based on patent portfolio analysis. Indicating the NPE status of an assignee with closely related patents is potentially valuable intelligence since NPE's tend to be litigious and are usually not interested in cross-licensing arrangements. In addition, some NPE's charge licensing fees that are in the financial range of a minimal legal defense to encourage a quick settlement. Having rapid access to relevant information about the validity and/or relevance of an allegedly infringed patent and the assignee's intentions derived from a pattern of prior behavior is critical to a satisfactory resolution.

Exemplary indicators may include:

Size of assigned portfolio

Total number of litigations

Percentage of times as a plaintiff

Universities always sue others but are seldom sued.

Percentage of patents of an assigned portfolio with litigation.

Number of litigations per litigated patent

Number of reassignments

Many reassignments involving different assignee types such as transitions from manufacturers to banks, to private investment entities, patent brokers, and/or private venture funds.

Lack of counterclaims is an indication of NPE status

In patent litigation, counterclaims may occur, e.g., when a defendant is accused of infringing a plaintiff's patent, the defendant counter-sued the plaintiff alleging that the plaintiff's product also infringes a defendant's patent. As both parties have patents and products, cross claiming infringement of each other's patents is often a strategy used for balancing the negotiation power in litigation. As NPE does not make/sell product, it is generally impossible for a defendant in a litigation brought by an NPE to counter claim patent infringement.

An exemplary profile of a NPE identified using above indicators:

| | |
|---|---|
| Assignee name: | XXXXXXXX |
| Patent Portfolio Count: | 295 |
| Active Granted/Pending Count: | 113 |
| Patents with Litigation Count: | 80 |
| Average Litigation per Patent: | 5.9 |

-continued

| | |
|---|---|
| Total Portfolio Litigation Count: | 1728 |
| Maximum Litigations per Patent Count: | 278 |

Figure 3:
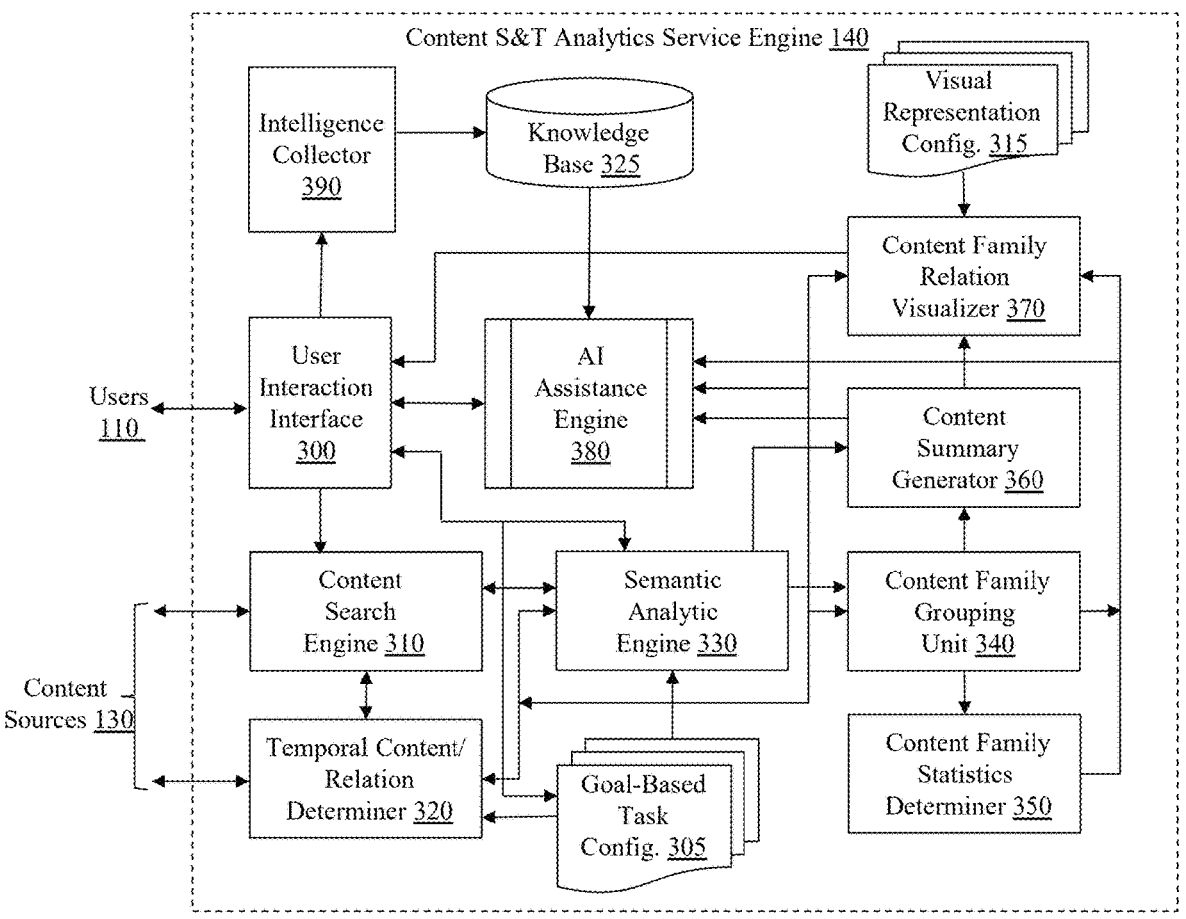
FIG. 3 shows an exemplary high level system diagram of a content S&T analytics service engine, in accordance with an embodiment of the present teaching.

FIG. 3 shows an exemplary high level system diagram of a content S&T analytics service engine 140, in accordance with an embodiment of the present teaching. In this illustrated embodiment, the content S&T analytics service engine 140 may include a user interaction interface 300, a content search engine 310, a temporal content/relation determiner 320, a semantic analytic engine 330, and a goal-based task configuration 305 to perform semantic and temporal analytics analysis based on user's goals. In addition, the content S&T analytics service engine 140 may include a content family grouping unit 340, a content family statistics determiner 350, a content summary generator 360, a content family relation visualizer 370 and a visual representation configuration 315 to summarize the analytics information and present the visualization results to the user interaction interface 300 based on the visual representation configuration defined for each goal. The content S&T analytics service engine 140 may further include an AI assistance engine 380, an intelligence collector 390 and a knowledge base 325 to communicate with the user to clarify user's goal, present summarized analytics information to the user, explain and discuss the results with the user, and track and collect the information presented to the user and user's feedback in terms of interactions via the user interaction interface 300. The information tracked and collected by intelligence collector 390 may be further analyzed and stored in knowledge base 325, which can be used by the AI assistance engine 380 for providing future interactions with the user.

In one embodiment, the user interaction interface 300 accepts input from user 110 and communicates the goal of the user to the goal-based task configuration 305 and retrieve corresponding goal-based task configuration. The input from user 110 may be textual content input by user directly, or converted from image, audio, video information collected by image, audio, video, virtual reality, or augmented virtual reality like interface with or without the help of the generative AI tools. The textual content input may be one or more keywords, concepts, topics, named entities, technical problems, solutions, brainstorming ideas, etc. User's goal can be specified via the user interaction interface 300, e.g., finding relevant information to the input text, finding information of companies with similar products, assessing a company of interest in terms of technology strength for potential transactions such as M&A, finding advanced researchers in a technical field, finding working partners, doing a landscape study of a technical field, doing a survey on topics of interest, assessing litigation risks, etc.

Metadata derived from patent related references, class codes, legal status, citation types, and citation sources have different weighting factors that influence relevance. Weighting may be adjusted and prioritized based on the user's selected objectives. If a "Patentability" objective is selected, all relevant results may be weighted equally for "legal status" since all relevant issued, withdrawn, abandoned, expired, and active patents and applications count as published prior art, and the analysis may be focused on both the specification and claims. If a "Freedom to Operate" objective is selected for the identical concept, active patents may receive a much higher weighting factor since they could potentially prohibit use of the invention or would require a license. In addition, uncited and/or highly relevant prior art, especially if no longer active, may also have a higher weighting factor since they could potentially be used to invalidate the patent of interest.

If a "Validity" objective is selected for a patent of interest, any relevant abandoned, withdrawn, expired, and/or active patents with an earlier priority date may be given a higher weighting factor especially if they were not cited by the patent of interest. This indicates that potentially relevant prior art was not cited by the examiner. Relevant abandoned and withdrawn patents may also be weighted higher since they were presumably rejected by the examiner.

If an "Infringement" objective is selected, any relevant issued active patents may be given a higher weighing factor, and the analysis may need to emphasize on the claim text.

Optionally, weighting factors can also be provided to the user via the user interface and can be selected and adjusted by the user. Weighting factors can be presented in a point scale such as 1 to 5 ranking, +0-rating, 10-point scale, 0 to 100%, and/or "star ratings".

Based on user's goal and the corresponding goal-based task configuration, user input information, which may also be called query, may be sent to the content search engine 310 to retrieve relevant content for the query. The content search engine 310 may be using any information retrieval techniques, e.g., Boolean keyword search, semantic search based on knowledge in ontologies, or large language models trained using deep learning techniques, to retrieve relevant information from data archives 150 and/or from external content sources 130. Depending on the user's goal, the retrieved content may be further analyzed by the temporal content/relation determiner 320 to perform temporal relationship analytics, e.g., extracting references and/or sequence information between retrieved content and some kind of timestamps associated with the content such as the initial publication date or final modification date, etc.

Additional searches on content and associated temporal information may be performed to retrieve additional referenced or related content if needed. The temporal relationship between the retrieved content, e.g., citations in scientific literature, weblinks in documents, webpages or other media, may form one or more temporal relationship networks, where each node may be one retrieved document or a group of retrieved documents and each edge reflects some kind of linkage from earlier nodes to later nodes. Groups may be generated by the content family grouping unit 340 using the grouping configuration defined for each goal. Individual document based grouping configuration may be the default for the content family grouping unit 340 when no grouping information is provided.

Depending on the user's goal, the semantic analytic engine 330 may perform semantic analytics on nodes based on the relations identified between nodes and compute additional statistics for each node according to a configuration defined for the content family statistics determiner 350. The most significant member of a group may be selected based on the family statistics defined for the goal to represent the group for visualization if applicable. The semantic and statistical information of each node combined with the temporal relationships between the nodes may be used to select one or more semantically relevant, significant temporal relationship paths, which combined with a summary generated by the content summary generator 360 for each node and/or path, may be sent to the content family relation visualizer 370 to produce interactive visualization in the user interaction interface. The position of each node in the path(s) and the summary information generated for each node may be used to identify the key documents or key groups of documents among the retrieved content, e.g., a seminal paper would be likely to occur at the beginning or in the early stage of a temporal relationship path and key improvements on the seminal idea may be at a later point where the path branches out to multiple developments, or sudden large amount of follow up developments.

The semantic and temporal analytics information may be generated based on content families grouped by the content family grouping unit 340, where content family based statistics may be controlled by the content family statistics determiner 350 as discussed above. In this case, the temporal relationships between individual content may be merged or consolidated between content families.

Some content may naturally include grouping information, e.g., a patent application and the resulting patent share the same application number and same specification, and a simple patent family includes a collection of patent applications covering the same or similar technical content. Members in the same patent family may share the same specification but have different claims, cases of which include international filings of the same patent specification, divisional or continuation application of previous applications of the same specification. Continuation-in-part application has similar technical content as the previous application with additional new matter in the specification. A granted continuation-in-part may have claims with a later priority date, than the original filing, reflecting the addition of new matter. The applications in a family are related to each other through priority claims.

A simple patent family is a collection of patent documents that are considered to cover a single invention. When a user's goal is to explore the technology area, returning one representative member from each family with a summary of the family may be sufficient. This is often called deduping which basically removes duplicate or near duplicate documents in order to reduce the presentation load and expose more varieties. The semantic and the temporal analytics may be consolidated at appropriate group level, e.g., application level or simple family level for patents. Based on the types of relations identified among the members within the family, the semantic analytic engine 330 determines what semantics to extract from related members and what criteria to use to select the most representative member for the family. For example, given a user's goal related to patent validity, if the temporal relationships identified for the patent family include divisional applications and/or continuation applications from multiple different patent authorities, then semantic analysis on the specification text and claim sets of members from the target authority would be automatically determined and performed for patent validity analysis, and may select the member with the closest claim set as the representative patent for the family.

If the temporal relationships identified for the family also includes CIP and the CIP member has the semantically closest claim set, then automatic analysis of the CIP and its parent(s) may be performed to determine the new matter introduced by the CIP and the priority date of the new matter may need to be taken into account in assessing the validity question. A summary of the patent family on the claim coverage may be automatically generated for the family and presented to the user along with the representative member. In other content collections, such as scientific documents, internal technology documents and webpages, duplicate or near duplicate documents also exist and applying certain grouping may increase the search efficiency and presentation variety. Because of such content grouping it is possible that one member may be a continuation or revision of a previous member, which implies temporal relationships exist between members of a content group.

Applying what type(s) of semantic and temporal analytics to a document or a group of documents depends on the analytics goals. In some embodiments, the initial semantic and temporal analytics may be applied to content groups to get a big picture of temporal relationships between content groups. In an example of patent documents, the initial analytics may be performed at the simple family level, i.e., each node in the network may be a simple patent family represented by the family ID or a selected patent from the family, and each edge may be citation between simple families generated by consolidating citations between individual patents or applications in each patent family. Then a subgraph may be generated for a family of interest, i.e., each node in the subgraph may be a member in a simple patent family in the above example, and each edge may be a sequence type relation so that the semantic and temporal relationship within a group may be revealed. Given that most if not all of the family members share the same priority date, the family subgraph may use the application date of each member to show the relative time span between the family members.

In an embodiment of the present teaching, the content S&T analytics service focused on content groups, semantic, temporal relationship and other meta information may be consolidated at appropriate group level depending on the goal. For example, citation information of different revisions or publications of the same paper may be consolidated for the same paper, which may then be further consolidated at the author level, the institution level, the journal level, etc. Various statistical measures such as influence factors may be applied to each group level accordingly. Similarly, patent citation, litigation and other meta information may be consolidated at the application level, i.e., citations to the application and granted patent may be merged, at the simple family level, extended family level, company level, industry level, etc. When multiple citations of different types occur between different members of two groups, the citation type with the highest weight for the analytics goal may be used during merging. Various statistical measures on the metadata of each patent, including but not limited to the patent factors assessing the quality of patents, litigation rates, renewal rates, etc. may be consolidated at appropriate levels by the content family statistics determiner 350. For example, a "citation index" may be provided for a simple patent family indicating the level, rate, and range of the citations for the entire published patent family.

Content summary may also be generated at appropriate grouping level and presented by the AI assistance engine 380 based on the knowledge collected from the user during a dialog or previous user input and deliver the information in a chat style step by step based on user's goal. In one embodiment of the current teaching, user's textual input, e.g., problem statements, search queries, technical disclosures, etc., and follow up interactions on results presented to the user in the current session or previous sessions related to the same goal may be collected, analyzed, and stored in a knowledge base, which may be used by a generative AI model to interact with the user and identify and/or generate relevant content for the goal. The generative AI trained on previously collected information, e.g., relevant prior art, learned from user interactions such as clicking, browsing for more detailed information, reading time for different user objectives, may automatically synthesize text and language-based user interactions for next step options, alternatives, alerts, documentation, document summaries, reports, etc. Specifically, textual description of the significant temporal relationship paths, the analysis of the relationships between the nodes in the path, descriptive summary of the nodes may be generated by the generative AI based assistant.

User interactions with the significant temporal relationship paths, e.g., exploring the meta information of the nodes in the paths, and relevance levels of the edges, etc., are monitored, stored and processed by a neural network working interactively with a generative AI based assistant. For example, if a user is interested in the science advancement in certain field and the semantics analytics engine 330 has discovered three types of technologies and their development timelines in the field with the help of the content search engine 310 and the temporal content/relation determiner 320, and automatically performed semantic analysis based on the relations discovered within each type of technology and generated a summary of major developments for each type of technology, the AI assistance engine 380 may take the semantic analytics engine 330 output and communicate the three types of technologies available to the user. The AI assistance engine 330 may present the results in a dialog style, e.g., depending on the user interest, the AI assistance engine 330 may respond with a high level summary of major developments and the timeline of the technology that the user is interested in instead of presenting details about all three technologies at once. If the user is interested in certain development in the path, the AI assistance engine 380 may suggest additional search and analytics depending on the user's goal. Interactions with one or more users via the user interaction interface 300 may be collected, analyzed and stored in the knowledge base 325, which may include user input query and goal, the results presented to the user and user's reactions to the results and follow-up queries and goals, etc. The knowledge learned from the user interactions may then be used by the AI assistance engine 380 to prioritize the result presentation and explanation.

In another embodiment of depicted FIG. 3, the user interaction interface 300 may accept image, audio, video, sensor information such as position, posture, temperature, etc., and the content search engine 310 may search image, audio, video, and additional sensor information directly and the rest of the components, e.g., semantic analytic engine 330, content summary generator 360, content family relation visualizer 370 may perform semantic analytics, generate summary and produce the visualization from various format of input. The AI assistance engine 380 may present the results using audio and video format in addition to text as well.

FIG. 4 is a flow chart of an exemplary high level process of the content S&T analytics service engine 140 based on the goal specified by the user, in accordance with an embodiment of the present teaching. Via the user interaction interface 300, the content S&T analytics service engine 140 receives, at 410, input and specified goal from the user. The content search engine 310 searches content relevant to the goal and user input at 415 from various sources. If the temporal search is needed at 420 for the specified goal, then the temporal content/relation determiner 320 searches, at 425, content temporally related to retrieved content, e.g., explicate dates of retrieved content and implicit temporal relationship created by citations. For certain goals, the temporal content/relation determiner 320 may detect temporal relations among retrieved contents and retrieve additional temporally related content and associated temporal information depending on the configuration defined in the goal-based task configuration 305.

Temporally related content and associated temporal information related to families of retrieved content may be searched and/or generated at 430 depending on the goal. Retrieved content and temporal information associated with the content are further analyzed at 435 using the semantic analytics engine 330. This may include but are not limited to topic analysis of each retrieved content or a group of retrieved content, semantic similarities and/or differences between retrieved content, categorization and/or clustering of retrieved content, quantified measures of content strength or influence, etc. The semantic analysis on retrieved content may depend on the temporal relations identified between content or content groups. For example, if the temporal relations among the retrieved content are different types of citations, then text classifiers trained on patent categories may be used to categorize non-patent literature which make it possible to apply analytics on patents and non-patent literature based on the same category structure.

Hierarchical clustering of retrieved content may generate a custom taxonomy for a content collection and allow exploring the content using the Categories in HD-Analyze by IP.com. Density-based clustering may be applied to documents placed on a Topic Map in HD-Analyze and produce regions on the map as another way to segment the content for further analysis. Categorization or clustering may be performed on adjacent nodes, e.g., patent documents, on the citation paths, which shows the technology focus of new development at each stage and how different approaches branch out from one technology. Temporal relationship analytics may be performed on all the retrieved content or a category or cluster within the retrieved content depending on the user's goal. Content family groups are generated at 440 by content family grouping unit 340 based on the grouping configuration defined for the goal, and appropriate statistics are determined accordingly by the content family statistics determiner 350 and calculated at 445 for each content family.

Content summary generator 360 may generate summaries for each content or content family at 450 depending on the user's goal. Combining the summary information of each content or content family, i.e., a node, with the temporal information between content or content family if applicable for the goal, the semantic analytics engine 330 creates a visual representation of relationships between significant content or content family at 455. The visual representation may be displayed in the content family relation visualizer 370 at 460. The AI assistance engine 380 may generate summary or description of the analytics results and interact with the user to get user feedback at 465 or receive new input and goal and perform a follow up or new analysis at 410.

Figure 5A:
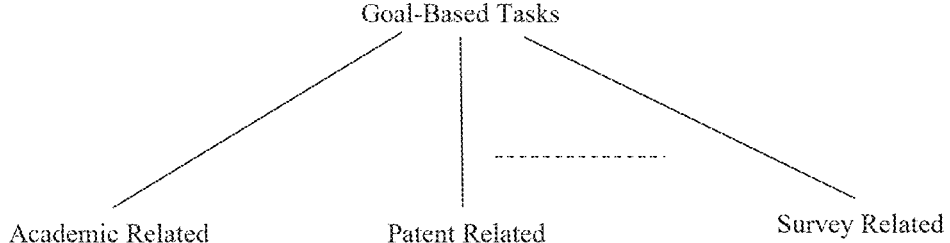
FIG. 5A illustrates exemplary types of goal-based tasks, in accordance with an embodiment of the present teaching.

FIG. 5A illustrates exemplary types of goal-based tasks that could leverage the content S&T analytics service engine 140 based on the types of content, e.g., academic related, patent related, survey related, etc., in accordance with an embodiment of the present teaching. Academic publications are often used to mine information for different goals. For example, technology focused analysis may include emerging technology identification, technology trend analysis, technology trajectory and technology influence analysis, etc., which are interested in finding most significant scientific papers in a scientific field and the relationships between each other. Entity centric analysis may focus the analysis within the published papers of an entity to study an entity's technology development, its influence in a scientific field, and the potential for collaboration etc. An entity may be a scientific journal, a research institute, a researcher, a company, etc. By leveraging the semantic and temporal analytics service, top research groups can be identified for a field of interest based on the scientific publications. Content analysis on online communications or social media is often used by researchers for survey related goal, which may leverage the content S&T analytics service to automatically discover user's opinion on a variety of topics such as events, people, companies, products, from online postings in discussion forums, blogs, comments or rating om publisher and/or eCommerce websites, blogs, etc., and monitor the development of the opinions overtime, etc.

Figure 5B:
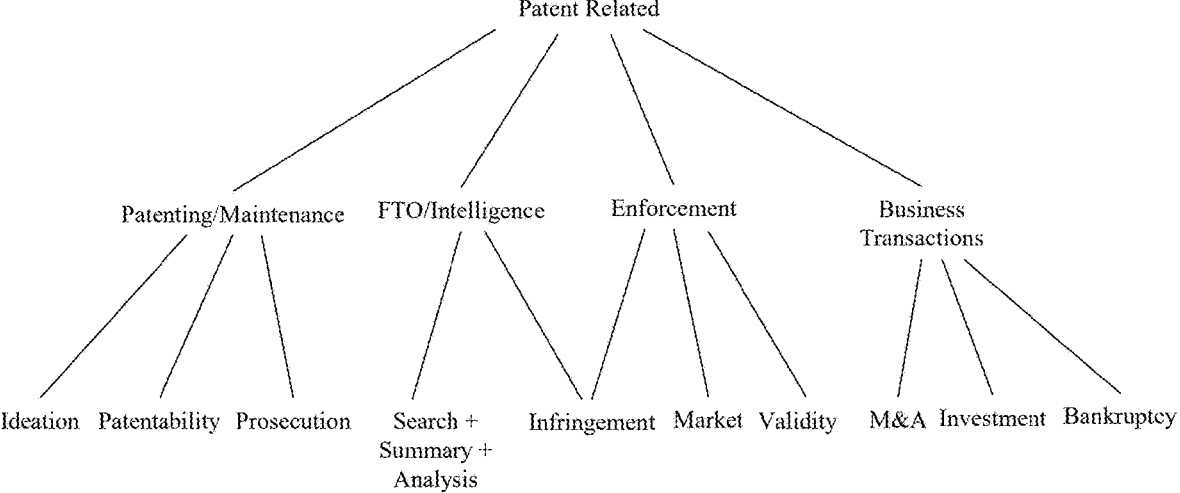
FIG. 5B illustrates exemplary types of patent related goal-based tasks that may leverage a content S&T analytics service to obtain information organized based on meaningful relations, in accordance with an embodiment of the present teaching.

FIG. 5B illustrates exemplary types of patent related applications that could leverage the content S&T analytics service, in accordance with an embodiment of the present teaching. There are many patent related analytics goals which may relate to the whole life cycle of a patent, e.g., patenting and maintenance, or its usage, e.g., freedom to operate (FTO) and competitive intelligence, patent enforcement and business transactions. Patenting includes ideation, patentability review, and prosecution, which may start from a technical disclosure of an idea to a full patent application with claims. In an embodiment where the analytics goal is ideation, the input from the user may be a technical disclosure for idea evaluation, expansion, and exploring alternatives. The temporal relationship analytics could perform more efficiently on a set of semantically relevant data set generated using semantic search. Some patents have a large number (1,000 or more) of backward prior art citations, the relevance of which could be in question since the applicant may be using the extreme volume of prior art references as a "smoke screen" to appear as a "due diligence" effort, but the relevance of each of these references may not be determined during the prosecution of the patent. A semantics-based patent search and analysis engine such as InnovationQ by IP.com may be used to determine which prior art references are most relevant. The unified information representation based Semantic Gist search engine that powers InnovationQ could gather semantically relevant documents that are not directly cited by the patent(s) of interest and also effectively remove irrelevant citations at the same time since the relevance based ranking pushes down citations that are not semantically related.

The significant temporal relationship paths could help inventors understand existing technologies, their development paths in prior art, and the prevailing technology trend, and evaluate the position of their own idea in the field of interest. The AI assistant may also help improve the original disclosure by providing solution ideas from the related nodes in the significant temporal relationship paths to expand the solution idea, or by providing alternatives in unrelated paths for the inventor to consider. User interactions with the displayed temporal relationship paths, such as selecting and reviewing information of the nodes and edges of interest and regenerating the significant temporal relationship paths from selected node(s), etc., may be recorded, analyzed and stored in a database, which may be learned and used by machine learning algorithms to prioritize the suggestions for later user interactions. In one embodiment, a generative AI model may be used to learn from user interactions to generate appropriate responses following user's action, e.g., idea summaries, risk assessments, alerts, alternative solutions, revision of disclosure, drafting claims, and expanding the disclosure to a full patent application, etc.

In an embodiment where the ideation is based on IQ Ideas by IP.com, a TRIZ (Russian acronym for the "Theory of Inventive Problem Solving") related engineering ideation is depicted in patent U.S. Pat. No. 11,657,102 and continuation application US20230252091 both titled "Method, System, and Data Storage Device for Automating Solution Prompts Based Upon Semantic Representation". In this embodiment, an artificial intelligence-based machine may analyze an engineering problem input by user and apply formalized heuristics to automatically present specific and/or concrete solutions derived from the 40 TRIZ's Inventive Principles and the 76 Standard Solutions for most common problems, which are technologically appropriate to the problem and utilize resources either already part of an existing engineering system, or easily introduced using known engineering methods.

In accordance with the current teaching, besides using rule sets and processes formalized during invention, innovation, engineering, research and development, manufacturing, and intellectual property practice to provide the user with problem solving options, suggestions, and alternatives, the AI assistant may provide an interactive visual understanding of the relevance of complex prior art technological, corporate, and legal relationships in real time and automatically identify potential opportunities and risks. To further enhance the efficiency and capabilities of the artificial intelligence, heuristic techniques are derived from expert human knowledge accrued by numerous practitioners in in multiple engineering, scientific, legal, and intellectual property fields. As with engineers who take numerous variables into consideration learned by training and experience and apply heuristic "rules of thumb" that allow a decision that has a high probability of being correct without having all the relevant information, patent searchers, agents, and lawyers intuitively know the implications of seemingly unrelated aspects of a patent or patent portfolio that may have significant implications of value, validity, and relevance. Examples include which patents are most relevant to various objectives, e.g., expired patents have no enforcement value but can be useful for validity or freedom to operate determinations, shorter claims tend to be broader and potentially more valuable, but risk being invalid due to uncited prior art.

A heuristic guideline derived from expert knowledge and learned from tracked user interactions and outcomes provides the AI assistant with basic rulesets regarding relationships and courses of action. An artificial intelligence uses these rulesets to process volumes of prior art publications to verify utility of the rulesets through statistical analysis and user interaction, and to make improvements and refinements in the rulesets as new information may be accrued.

Computer based mechanisms may be used to track the information presented to the user and user interactions, which includes but is not limited to solutions reviewed, time spent reviewing before moving on to the next solution prompt, number of new solution candidates created after review before moving on the next solution prompt. The system allows the user to go back and forth on already presented specific solution prompts, learns the presentation rate and the probability of success for each type or class of TRIZ Inventive Principles, heuristic, separation techniques, or standard solutions underlying the generic solution prompt from which the respective specific solution prompt was constructed, and adjusts the prioritization strategy as the user proceeds. For example, the scores of certain specific solution prompts may be reduced dynamically if the user keeps ignoring the class of generic solution prompt from which the respective specific solution prompt was constructed even though their initial scores could be high. Certain types of solutions that were not presented initially, after some time may be given a chance to be presented to the user. This tracking and learning mechanism can work across the boundaries of queries and users, which ends up building a concept/principle relationship network database. The network not only links concepts to generic solution prompts, principles, heuristics, techniques or standard solutions with probabilities, but also includes the interactions among the principles/techniques/solutions coupled with specific concepts. For example, one type of concept/principle couple often leads to another concept/principle couple. This knowledge learned from previous user interactions can be applied to other users with similar context later.

In another embodiment of the TRIZ Inventive Principle based ideation workflow, the above described user interaction sequences may be fed into large language models to generate solution prompts and interact with the user automatically. The LLM may be customized by training on TRIZ's Inventive Principles, standard solutions, and relationship between the 40 Inventive Principles and 76 standard solutions to better understand the engineering problems and inventive concepts in designing a system, e.g., segmentation of objects, extraction of parts from objects, local quality in terms of structure and function, asymmetry form, consolidation for space, time or operation, etc. By including problem and solution examples in patent data, non-patent literature, documents from different industries, along with previously collected user's interactions with their specific problems and solutions in the training data, the LLM may identify pain points in the user input problems, and/or help show how to apply inventive principles to solving problems.

Most problem solving may be done by applying knowledge of existing technology and solutions that have worked before to related (and sometime unrelated) fields. An LLM may be used to help solve problems in a brainstorming style chat. Generative AI excels at this. For example, consider the following problem:

To prevent deterioration of power transmission towers and communication towers operators apply a protective paint. However, the cost of maintenance and the frequency of repainting is too high. This can be caused by Damage of the paint from ultraviolet rays.

Damage of the paint from salt air.

Poor impact resistance of the paint

Poor Humidity resistance of the paint

The following response was obtained from an LLM.

Here are some ideas for solving the problem of high maintenance and frequent repainting of power transmission towers and communication towers:

Use a more durable paint: Develop or use a paint that is specifically designed to withstand exposure to ultraviolet rays, salt air, humidity, and impact. This could involve using advanced materials like nanomaterials, polymers, or ceramics that have improved resistance to environmental factors.

Apply a protective coating: Instead of repainting the entire tower, apply a protective coating to the existing paint. This coating could be a clear or tinted layer that seals in the paint and provides an additional barrier against environmental damage. The coating could be applied using various methods such as spraying, brushing, or rolling.

Apply a protective wrap: Instead of painting the tower, apply a protective wrap made from advanced materials like vinyl, polyester, or Kevlar. This wrap would provide a barrier against environmental damage and could be easily replaced when needed.

Use self-healing paint: Develop or use a self-healing paint that can repair itself when damaged. This type of paint contains special additives that react to changes in temperature, pressure, or other environmental factors to heal cracks or scratches. While not yet widely available, this technology is being developed and could offer a promising solution to reducing maintenance and repainting needs.

While these are all reasonable ideas for solving the initial problem, they are not particularly innovative. This may be expected since the generative AI tends to use text snippets it has been trained on, simply rearranged to correspond to the current chat. We have found that by introducing TRIZ heuristics, the generative AI can be forced into responses that are much more innovative and thought-provoking. Consider the following chat sequence that is a continuation of the ideas generated in this example.

Prompt: Now apply TRIZ principle 34, "Dispose after the job is done" to come up with a few new ideas for solving the problem of high maintenance and frequent repainting of power transmission towers and communication tower Response: Sure! Here are some ideas for solving the problem of high maintenance and frequent repainting of power transmission towers and communication towers using TRIZ principle 34, "Dispose after the job is done".

Disposable paint: Develop a disposable paint that can be easily removed and replaced when damaged or no longer needed. This paint could be designed with a special coating or layer that allows it to peel off easily without leaving residue. The disposable paint could reduce maintenance costs and extend the life of the protective coating.

Paint with built-in self-destruct mechanism: Develop a paint that contains a self-destruct mechanism, such as a timer or sensor, that triggers the paint to break down or dissolve after a certain period of time or exposure to environmental factors. This would eliminate the need for manual removal and reduce maintenance costs.

Paint with embedded sensors: Develop paint with embedded sensors that monitor environmental factors like temperature, humidity, and UV radiation. When the sensors detect damage or degradation of the paint, they can trigger an alarm or alert, notifying maintenance personnel to take action before significant damage occurs. This approach would allow for proactive maintenance and reduce the likelihood of costly repairs.

Continuing the chat with another TRIZ Inventive Principle prompt generates additional creative ideas.

Prompt: Now Apply TRIZ principle 2, "Extract and augment (Take out)"

Response: Sure! Here are some ideas for solving the problem of high maintenance and frequent repainting of power transmission towers and communication towers using TRIZ principle 2, "Extract and augment (Take out)":

Remove paint and use a sacrificial layer: Instead of painting the entire tower, apply a sacrificial layer that can corrode or degrade in place of the paint. The sacrificial layer could be made from a less expensive material like zinc or magnesium that is designed to corrode more quickly than the protective paint. This approach would reduce maintenance costs and extend the life of the protective coating.

Remove paint and use a non-stick surface: Instead of painting the tower, apply a non-stick surface that prevents dirt and other substances from sticking to it. The non-stick surface could be made from materials like Teflon or silicone that are known for their non-stick properties. This approach would reduce maintenance costs by eliminating the need for cleaning and repainting.

Remove paint and use a hybrid coating: Develop a hybrid coating that combines different materials to provide protection against corrosion and wear without the need for paint. The hybrid coating could be made from a combination of materials like ceramic, metallic, and polymer layers that work together to provide excellent barrier properties and durability. This approach would reduce maintenance costs and extend the life of the protective coating.

Generative AI based systems, which are capable of production, manipulation, and modification of data and text by automated means, especially through the use of natural language processing, can be used to reveal and present complex patent relationships automatically. In another embodiment of the TRIZ Inventive Principle based ideation workflow, the generative AI based assistant may generate invention disclosure and other patent related output based on user selected solutions, e.g., analyze and revise user input disclosure and/or turn it into a draft patent application or attorney ready disclosure, saving the users hours of tedious work. The generative AI systems may also be used to reveal critical information about patenting entities, including M&A targets or NPE targets. For example, descriptive summaries of a company's key technology approaches can be generated even before conducting a patent search and can be used to guide and focus those searches by providing key phrases and descriptions.

Inventors can usually write a short description of their invention, but struggle with writing an adequate description to enable their patent attorney to start working on a patent application. This document is sometimes referred to as an Attorney Ready Disclosure (ARD). Generative AI can take the unformatted invention description and convert it into a well-formatted ARD.

Prompt: I want you to convert an invention description into an attorney ready disclosure.

Here is the invention description:

Problem: Ammonia production process releases carbon dioxide. It is a harsh, expensive process and not environmentally friendly.

Solution: Use wet gas scrubbing technique to capture carbon dioxide emitted during the production phase. Then liquefy and store the $CO_2$ for later use or through catalytic conversion break the $CO_2$ into solid carbon and oxygen.

Response: I can certainly help you with that! Here's a possible disclosure document based on the invention description you provided:

Title: Carbon Dioxide Capture and Utilization System for Ammonia Production Process Abstract: A system for capturing and utilizing carbon dioxide emissions from an ammonia production process, comprising a wet gas scrubbing unit to capture $CO_2$, a liquefaction unit to liquefy the captured $CO_2$, and a storage unit to store the liquefied $CO_2$ for later use or conversion into solid carbon and oxygen through catalytic conversion.

Independent claims:

1. A carbon dioxide capture and utilization system for an ammonia production process, comprising:

A wet gas scrubbing unit to capture carbon dioxide emissions from the ammonia production process;

A liquefaction unit to liquefy the captured carbon dioxide;

A storage unit to store the liquefied carbon dioxide for later use or conversion into solid carbon and oxygen through catalytic conversion.

2. A method for capturing and utilizing carbon dioxide emissions from an ammonia production process, comprising:

Capturing carbon dioxide emissions from the ammonia production process using a wet gas scrubbing unit;

Liquefying the captured carbon dioxide using a liquefaction unit;

Storing the liquefied carbon dioxide in a storage unit for later use or conversion into solid carbon and oxygen through catalytic conversion.

LIST OF FIGURES

1. Schematic diagram of the carbon dioxide capture and utilization system
2. Wet gas scrubbing unit
3. Liquefaction unit
4. Storage unit Background Specification: The production of ammonia through the Haber-Bosch process releases large amounts of carbon dioxide, a potent greenhouse gas contributing to climate change. Current methods for capturing and utilizing CO2 emissions from this process are expensive, energy-intensive, or have limited applicability. There is therefore a need for an efficient, cost-effective system to capture and utilize carbon dioxide emissions from the ammonia production process.

Detailed Description of Invention: The present invention relates to a system for capturing and utilizing carbon dioxide emissions from an ammonia production process. The system comprises three main components: a wet gas scrubbing unit, a liquefaction unit, and a storage unit.

The wet gas scrubbing unit is designed to capture CO2 emissions from the ammonia production process. It uses a solvent, such as monoethanolamine or diglycolamine, to absorb the CO2 from the flue gas stream. The solvent is then heated to release the captured CO2, which is fed into the liquefaction unit.

The liquefaction unit uses a refrigerant, such as propane or ethylene, to cool the captured CO2 to its boiling point. This causes the CO2 to liquefy, making it easier to store and transport. The liquefied CO2 is then transferred to the storage unit for later use or conversion into solid carbon and oxygen through catalytic conversion.

The storage unit is an insulated container designed to hold the liquefied CO2 at low temperature. It is equipped with safety features such as pressure relief valves and emergency shutdown systems to prevent accidents. The stored CO2 can be used in various applications, such as carbon capture and storage (CCS), enhanced oil recovery (EOR), or the production of chemicals and materials.

The present invention offers several advantages over existing methods for capturing and utilizing CO2 emissions from the ammonia production process. It is more energy-efficient than traditional methods, such as cryogenic distillation or pressure swing adsorption, which require significant amounts of electricity to operate. Additionally, it can capture a higher percentage of CO2 emissions, reducing greenhouse gas emissions and helping to mitigate climate change. Furthermore, the liquefied CO2 produced by the system can be easily transported and stored for later use, making it a versatile solution for various applications.

In an embodiment where the analytics goal is patentability, the input may still be one or multiple disclosure of ideas, but the goal-based task configuration recorded in 305 may be different for patentability than for ideation since temporal relationship analytics may be focused on the analysis of prior art that is closely related to the disclosure for patentability instead of broad coverage for brainstorming needed for ideation. In the embodiment with a generative AI, the prompts and responses may focus on the patentability of the input disclosure.

In an embodiment where the analytics goal is patent prosecution or maintenance, the input may be the full patent application or the claims. The goal-based task configuration would be focused on the prior art for patent prosecution but focused on the technology trend and the position of the patent of interest for patent maintenance decisions.

In an embodiment where the analytics goal is FTO or competitive intelligence, the user input may be a text query describing a product or planned product, potentially patentable inventive concepts, patented method, apparatus, service and/or system, one or more technical fields or sub-technical fields of interest. The goal-based task configuration for FTO and competitive intelligence would provide an option to search only active patents in the target market for FTO and search only patents from targeted companies for competitive intelligence respectively when gathering patents that are semantically relevant to the input textual query. The significant temporal relationships paths in the returned relevant documents could reveal related technology lines. The position of the nodes in the path and the summary information of each node may be used to identify key documents in the path for review, e.g., flag relevant key patents and/or applications that are active, litigated, assigned to potential NPEs or target companies. If no relevant patents are identified, flag any relevant inactive patents or any pending patent applications that may, once granted, pose some threat to the product in terms of infringement. In the embodiment where the goal is infringement analysis for FTO, the claim language of identified patents may be analyzed by the semantic analytic engine 310, e.g., independent claims may be broken into components and compared to the features in the input descriptions to identify potential risks.

In an embodiment where the goal is competitive intelligence, the meta-information of each node in the significant temporal relationships path may provide indications of technology development trends and predictions, extrapolating activity, potential competitors, filing trends, etc. Information that provides indications of technology development trends and predictions, extrapolating activity include monitoring and presenting changes in filing rates, citation rates, litigation rates, etc. and/or combinations thereof by selected entities, semantic query results, class codes, and other available patent related content and/or metadata. For example, if a company is a competitor and has started filing patents in a new class code—this could be an indication of a change in commercial focus, new process, and/or new product. If there has been a significant increase in the filing rates in class codes a target company practices in by new entities that are not typical competitors. This information could be presented as an "alert". A patent that has received numerous citations from competing or new entities could be an indication of a growing demand for the specific technology and/or potential patent infringement. If a patent in the path has a large and growing family of continuations and divisionals, it is most likely considered as important to the assignee. Alternatively, if a large portion of highly relevant patents, related class codes, or patents held by assignees practicing in similar markets have been abandoned or expired due to lapsed maintenance fees, this may be an indication of a declining corporation, market, and/or obsolete technology.

In an embodiment where the analytics goal is patent infringement, the input may be the allegedly infringed patent or patents. The goal-based task may be configured to gather more information of the company that owns the allegedly infringed patent(s) in addition to searching relevant patents related to the input patent(s) for semantic and temporal relationship analysis. The information of the company, e.g., the number of patents owned by the company, the litigation rate, the international filing rate, etc., may be used to assess whether the company is a potential NPE. The search for temporal relationship analysis may be restricted to the patents owned by the defendant. Any patents from the defendant that occur in the temporal relationship path before and/or after the allegedly infringed patent(s) may be flagged with relevance information. Highly relevant patents from the defendant that have earlier priority date than the input patent(s), whether connected with the temporal relationship path of the input patent(s) or not, may also be flagged for validity analysis. Based on the NPE assessment results, the existence and relevance of the prior art and/or citing patents from the defendant, the AI assistant may generate proposed defense strategy for the user. Depending on the size of the patent portfolio owned by the defendant, the temporal relationship analytics may start at the simple patent family level and then drill down to the subgraph at family member level for family of interest, or it may start at the family member level directly. In the latter case, links between family members may be represented differently in the visualization, e.g., using different color or line pattern to distinguish them from relationships between non-family members.

When a patent or patent portfolio of interest is part of a large family of published issued and pending continuations and/or divisionals, a customizable extractive AI summarization, e.g., the Synopsis AI within InnovationQ by IP.com, may be used on each claim set to determine the focus and intent of individual patents. Pending claim versions are usually much broader than the claim versions that may or may not issue. Pending claims also provide an indication of the inventor's original intent and are useful as prior art, being broader in scope, but the issued version may be limited to a narrower scope and are less likely to be infringed. Comparing claim text to specification text can also identify potential validity issues by indicating unsupported claim text. In related embodiments that need claims analysis or claims comparison, a generative AI based assistant may be used to compare claims sets of different family members, or allegedly infringed or invalid patents and provide a narrative description of the differences. The unique part of the claims of each family member may be added to the corresponding nodes in the visualization of the temporal relationship paths within the family. If a critical time exists for the goal, e.g., the priority date of the allegedly infringed patent or the new matter in a CIP, then a mark on the time based axis could quickly identify the prior art in all temporal relationship paths in the visualization, e.g., a vertical line positioned at the priority date on the X-axis crossing all the paths in the visualization. This visual identification of prior art family members combined with the claim differences shown for each member could help user quickly identify potential infringement or validity issues.

When a continuation-in-part is compared to the parent patent, Synopsis AI may be used to determine the focus and intent of the new matter and to focus the attention of the reviewer. This type of information may be useful for enforcement, infringement, and validation efforts. For example, a potentially infringing product may have been produced and sold prior to the addition of the new matter making the patent unenforceable and could invalidate the patent. In addition, new matter added as figures and/or text can be highlighted or otherwise indicated in the specification and claims for the convenience of the reviewer. In some cases, critical claim language text in a parent patent, continuation, continuation-in-part, and/or divisional does not appear in the patent specification. This condition may be used to invalidate the patent or warrant a Section 112 rejection if the case is still pending. In one embodiment, a generative AI based assistant may work with Synopsis AI to flag potential invalid patent or Section 112 rejection on a pending CIP. The generative AI may identify the unique features claimed by the parent patent, any continuation, continuation-in-part and/or divisionals, especially the new matter in the claim language of the CIP in question, which are then sent to the Synopsis AI to verify the support of each unique feature and the new matter in the spec. Depending on the goal, the generative AI based assistant may generate a report summarizing the unique features of all or selected family members and/or new matter in the CIP, their supporting materials in the spec, and flag potential issues if not enough support for any feature is identified.

In an embodiment where the analytics goal is a business transaction such as M&A, investment or bankruptcy, the input may be one or more companies of interest. The goal-based task configuration may provide an option to focus on certain technologies of the companies of interest when gathering patents from these companies. The temporal relationship analytics may focus on self-citations, i.e., citations from the same inventor or colleagues in the same company. Multiple core technology areas may be revealed by multiple unconnected groups of temporal relationship paths. Key patents and inventors from the company of interest may be identified and flagged based on the goal-based task configuration and the statistics determined for the goal. If multiple companies are of interest, nodes that belong to the same company of interest may be identified using color or other means to show the coverage and overlap of the technologies between the companies of interest.

One complication with patent related analytics is that patents may have large family members due to various reasons:

The original parent patent describes a system with various interactive components and the continuations and divisionals focus on individual components and/or their interactions.

The original parent patent describes a basic invention with numerous alternative embodiments which can be very different from each other.

NPE's file or acquire a pending patent and continue to file continuations, divisionals, continuations-in-part to expand the scope of the patent and the amount of potential infringement targets. There may be exceptionally long prosecution cycles with various patent authorities in cases like these. An analysis of the text obtained from authority file wrappers can also provide additional information and context regarding the intent, scope, and limitations of the patent.

Some characteristics of large patent families may provide useful indication for certain analytics goals, therefore, corresponding family statistics may be determined and config-
ured in the goal-based task configuration accordingly:

Is a large patent family count due to a broad international
filing strategy or the number of co-filed applications,
continuations, divisionals, and/or continuations-in-part
from a small original portfolio? If a large patent family
has few or no international filings, it may be another
indication that the assignee may be an NPE, since the
investment to create a large patent portfolio limited to
the US market may be intended to be used offensively
for a license fee with no manufactured product or
service provided by the assignee. Also, Europe is not an
NPE-friendly environment due to their "loser pays"
court system.

Very large specifications may include hundreds of pages
of text and figures which are used to create a large
patent portfolio via co-filed applications, continuations,
and/or divisionals all with the same priority date. One
additional way to determine if the assignee is an NPE
may be to review the specification for implementing
technology and semantic coherence of the content.
Does the specification describe the "how" as well as
"what"? Does the specification include: workflow
charts, lines of code, circuit diagrams, detailed figures,
and/or references to actual products on the market? Is
the content in the specification semantically coherent?

Many NPE's acquire patents and portfolios from asset
sales, patent brokers, and/or as compensation for legal
fees from defunct clients. Patents and portfolios like
these may be purchased for a fraction of the R&D
expenditures, patent acquisition costs, and paid main-
tenance fees. Some NPEs offer non-exclusive licenses
at rates that are lower than the estimated legal defense
fees to encourage a quick settlement whether the patent
is valid or infringed or not.

Beyond normal thresholds, the litigation rate of individual
patents and/or an assignee's portfolio are key indicators
of potential NPE activity, especially if the assignee has
no products or services, is a law firm, and/or licensing
entity. An assignee with no products and a small diverse
portfolio that has a history of hundreds of unsettled
litigations, and a long series of assignees is most likely
an NPE. "Normal thresholds" for litigation rates can be
derived/determined by an analysis of similar relevant
patents, class codes, assignees, and/or portfolios.

Litigation rate thresholds and their granularity can also be
set and/or selected by the user, such as, "identify all
active patents within a selected class code range and/or
relevance score owned by assignees with portfolios
with litigation rates above X". Also, if the system
identifies an active patent that is relevant to a patent of
interest and if that patent has a litigious history or
assignee, it would be automatically identified.

If a patent has a large family the claim sets of various
family members may have very different claim char-
acteristics:

(1) What is the word count of the claims, and the
independent claims? This may be used to prioritize
individual patents since short claims tend to be
broader. In a series of family members, the ones with
short claims are most likely the ones most important.

(2) How many Independent claims does each family
member have? What is the total claim count of
independent and dependent claims for each family
member?

(3) Are the claims "Method" claims, "Apparatus",
"System" "Computer Readable Media" claims?

Some claim types may accrue infringement damages
from the moment of infringement, other types only
accrue infringement damages after the infringing
party is notified of the infringement. This could be
flagged and/or represented graphically in terms of
"enforcement windows" illustrating the differences
between different types of claim sets.

Because of these complications in patent data and legal
status of each patent application, various link and node
configurations and visualizations may be provided based on
different analytics goals. For example, if the user's objective
is a "Patentability" search, then issued, pending, abandoned,
and withdrawn patents are all relevant since they all provide
published prior art and would be weighted equally. With a
"Freedom to Operate" search, the emphasis or "weighting
factors" would be applied to relevant active granted patents,
especially if they have a litigation history or are assigned to
a litigious and/or non-practicing entity. Multiple selectable
link and node presentations would be modified to reflect and
emphasize these objectives and resulting patent relation-
ships. Emphasis on a graphical presentation can include
highlighted color-coded alerts for patents of interest, with
color key and/or text indications of legal status, litigation
history, term length, assignee, number of reassignments, etc.
This could consist of a static graphical presentation and/or a
dynamic interactive graphic user interface. Granularity mea-
suring the level of detail in a data presentation can be user
selectable and/or responsive to the size of the pool of
relevant items being analyzed and/or presented.

Figure 6A:
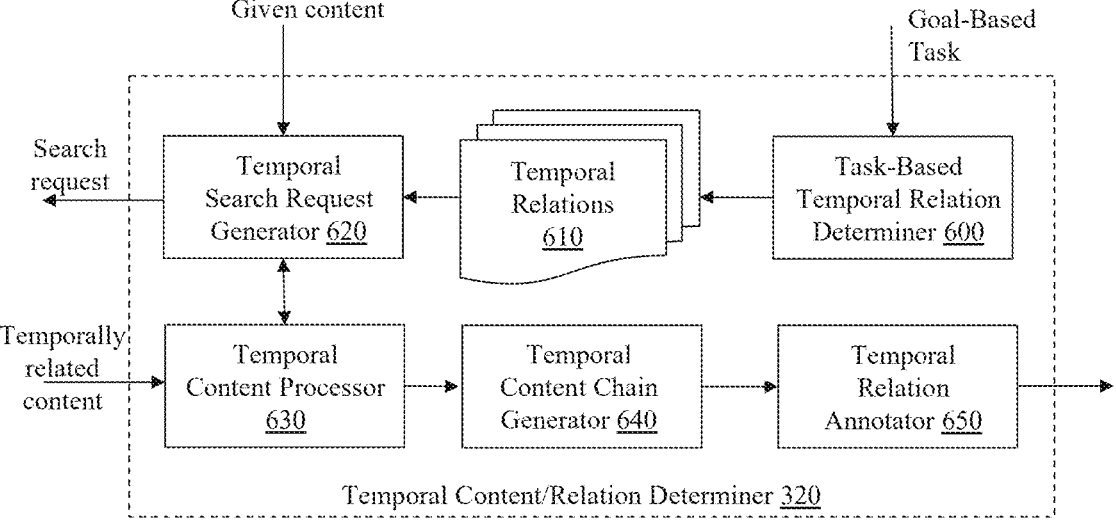
FIG. 6A depicts an exemplary high level system diagram of a temporal content/relation determiner, in accordance with an embodiment of the present teaching.

FIG. 6A depicts an exemplary system diagram of the
temporal content/relation determiner 320, in accordance
with an embodiment of the present teaching. In this embodi-
ment, the temporal content/relation determiner 320 includes
a task-based temporal relation determiner 600, a temporal
search request generator 620, a temporal content processor
630, a temporal content chain generator 640, and a temporal
relation annotator 650. Given a goal-based task, which may
be retrieved from the goal-based task configuration 305, the
task-based temporal relation determiner 600 may determine
the appropriate temporal relations 610 to be identified and
mined for the input goal-based task. Given the content,
which may be from the content search engine 310 (which
may include the user input content) and the determined
temporal relations 610, the temporal search request genera-
tor 620 may generate a temporal search request to track
additional content that are related to the given content
according to the determined temporal relations 610. The
temporal search request may be used by the content search
engine 310 to track and obtain the additional temporally
related content, which, upon received by the temporal con-
tent processor 630, may be further processed to extract
temporal connections among the additional content pieces to
establish the relations among additional content pieces.
Additional temporal search request may be generated by the
temporal search request generator 620 based on the results
of the temporal content processor 630, which may be used
by the content search engine 310 to track and obtain addi-
tional content temporally related retrieved content. Based on
such obtained relations, the temporal content chain genera-
tor 640 may chain the content together based on the temporal
relations uncovered from the received additional content
pieces. Temporal relation annotator 650 may then operate to
annotate and weigh the content (including the given content
and the additional content) as well as the temporal relations
between/among the content pieces using weights determined
in accordance with the goal-based task. The annotated
temporal content chain may be output to the semantic analytic engine 330 and other functional units for further analysis and visualization, etc.

Figure 6B:
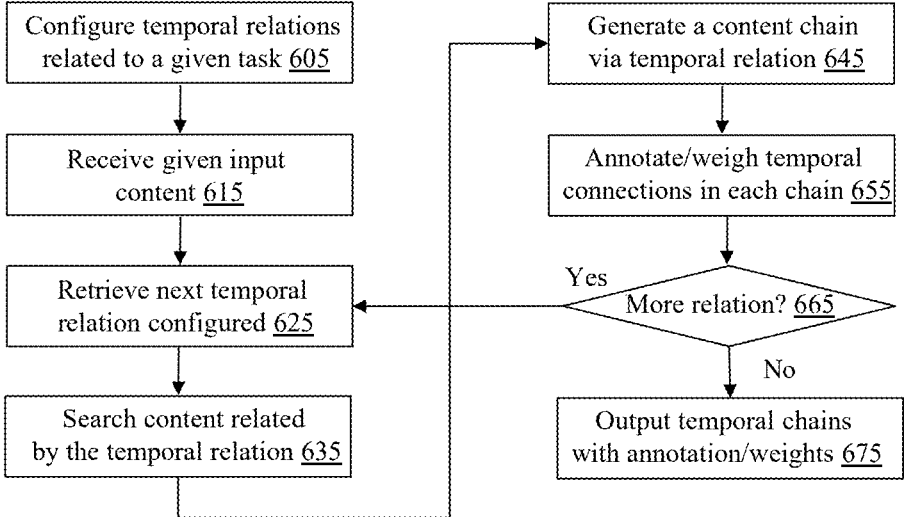
FIG. 6B is a flowchart of an exemplary process of a temporal content/relation determiner, in accordance with an embodiment of the present teaching.

FIG. 6B depicts an exemplary workflow within the temporal content/relation determiner, in accordance with an embodiment of the present teaching. In this embodiment, given a goal-based task, the task-based temporal relation determiner 600 may identify and configure the temporal relations that need to be analyzed for the given task at 605. For example, the goal of the user may be to decide whether to file a continuation application of a patent application with allowed claims. The goal-based task may then compare the allowed claims with the specification and determine whether any invention or subject matter that is disclosed in the specification but has not yet been claimed so that a continuation application may be warranted. In some situations, the application with allowed claims may be a continuation of a parent patent, which may have divisional or other continuation applications. Therefore, the event sequences of different applications may be identified based on data from appropriate patent authority and corresponding temporal relations to be used to search for temporally related additional content may be configured at 605. The temporal search request generator 620 may receive given input content (which may be the allowed patent application in the above example), at 615, retrieve the configured temporal relation(s) for the task at 625, and generate a temporal content search request to search, at 635, for the additional content, e.g., the parent patent, related by the temporal relation. The retrieved additional content may be processed by the temporal content processor 630 in connection with the given content, where additional temporal content search requests may be generated to retrieve more content temporally related to the previously retrieved content for processing, e.g., parent of the parent patent, and a content chain formed via the temporal relation(s) may be created, at 645, by the temporal content chain generator 640. Temporal relations on the temporal content chain may be annotated, at 655, with, e.g., types and weights determined based on the task. The temporal content/relation determiner 320 may check at 665 whether more relation is configured. If yes, then go to step 625 to retrieve the next temporal relation configured and repeat step 635, 645 and 655. If no more relation is configured, then go to step 675 to output the temporal chains with annotation and weights. In the above example, all simple family members of the allow patent that are from the same patent authority may be retrieved and chained together based on the temporal relation with annotation of relation types.

Figure 7A:
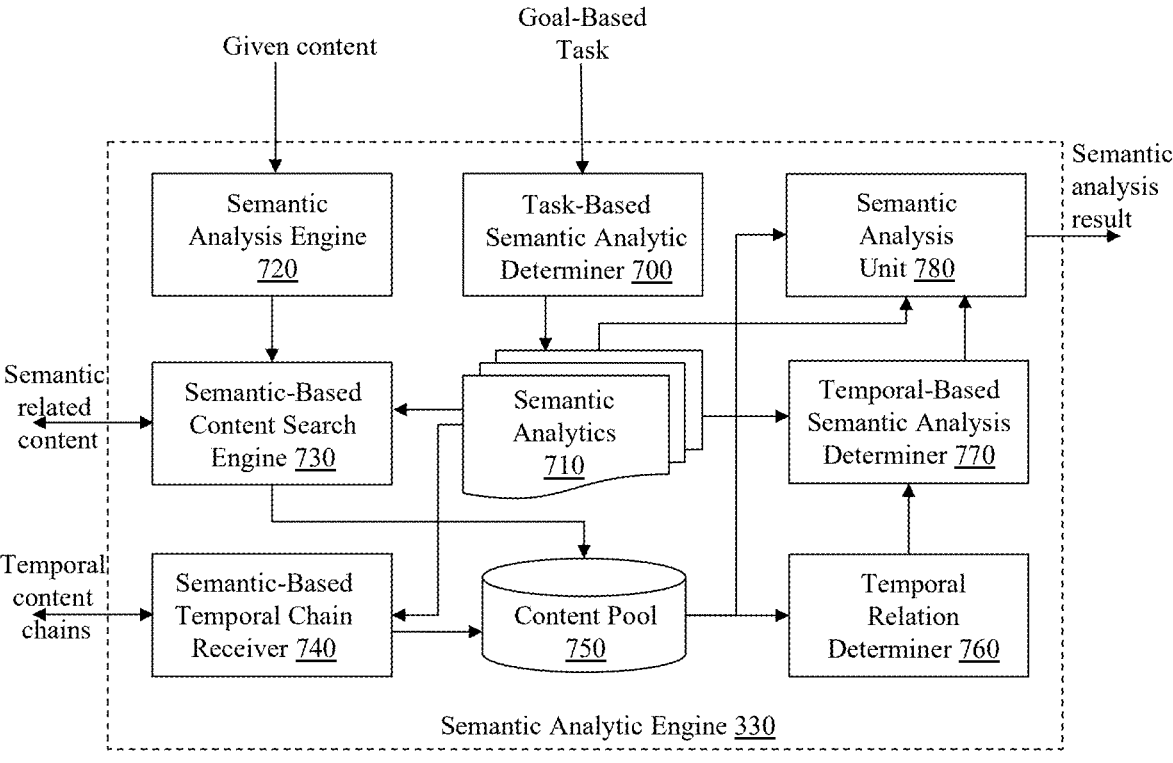
FIG. 7A depicts an exemplary high level system diagram of a semantic analytic engine, in accordance with an embodiment of the present teaching.

FIG. 7A depicts an exemplary system diagram of the semantic analytic engine 330, in accordance with an embodiment of the present teaching. In this embodiment, the semantic analytic engine 330 may include a task-based semantic analytic determiner 700, a semantic analysis engine 720, a semantic-based content search engine 730, a semantic-based temporal chain receiver 740, and a content pool 750. Based on the goal-based task input, the task-based semantic analytic determiner 700 determines the semantic analytics 710 to be performed for facilitate the goal-based task. Based on the given content from the user interaction interface 300, the semantic analysis engine 720 may perform semantic analysis (e.g., determine the topics of the given content) and provide to the semantic-based content search engine 730. To continue with the semantic analytics 710 (to facilitate the goal-based task), the semantic-based content search engine 730 obtains via, e.g., either search or retrieval, other content that is semantically related to the given content according to the semantic analytics 710 to be performed to achieve the goal-based task. The given content as well as the semantically related content may then be stored in content pool 750.

In order to facilitate the semantic analytics 710, semantically related content may be retrieved by the semantic-based content search engine 730. In addition, the semantic-based temporal chain receiver 740 may be provided to obtain related temporal content chains associated with the, e.g., the given content and/or the semantically related content which may be needed for performing the semantic analytics 710. All the retrieved content for performing the needed semantic analytics 710 (e.g., the given content, the semantically related content, and related temporal content chains, i.e., the semantic-based temporal information) may be stored in the content pool 750. The semantic-based temporal information may include e.g., a chain of events, with each of the events having descriptive text to define the nature of the event, and temporal linkages, and a chain formed via the temporal linkages to chain different events in a semantic meaningful way.

The semantic analytic engine 330 may further include a temporal relation determiner 760, a temporal-based semantic analysis determiner 770, and a semantic analysis unit 780. The temporal relation determiner 760 may be provided to analyze the pooled content to determine temporal relations between/among different pieces of the content stored in the content pool 750. As discussed herein, the nature of the temporal relationships between different documents may provide guidance as to what is the meaningful semantics that may be revealed. Depending on the type and nature of the temporal relationships identified between/among documents in 750, the temporal-based semantic analysis determiner 770 is provided to determine the specific and relevant type(s) of semantic analysis to be performed with respect to the goal-based task. According to the type of semantic analysis to be performed, the semantic analysis unit 780 may be provided to carry out the determined type of semantic analysis consistent with the goal-based task to generate corresponding semantic analysis results.

Figure 7B:
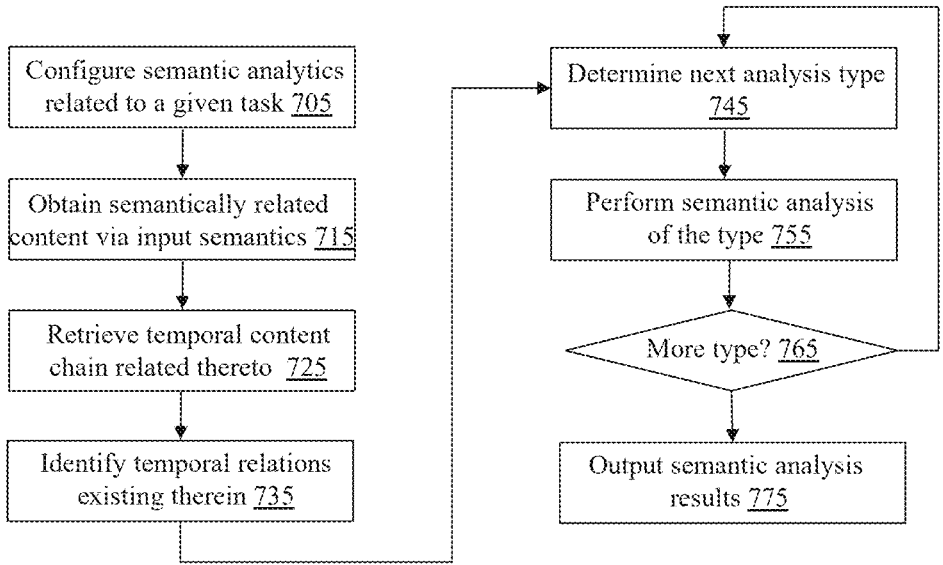
FIG. 7B is a flowchart of an exemplary process of a semantic analytic engine, in accordance with an embodiment of the present teaching.

FIG. 7B is a flowchart of an exemplary process of the semantic analytic engine 330, in accordance with an embodiment of the present teaching. In this embodiment, the task-based semantic analytic determiner 700 may determine, at 705, based on the goal-based task, needed semantic analytics and store it in 710. The semantic analysis engine 720 may perform semantic analysis on the given content to obtain the semantics (e.g., topics) of the input content, which is then used by the semantic-based content search engine 730 to obtain, at 715, semantically related content determined according to the semantic analytics 710. In addition, depending on the semantic analytics 710 to be performed with respect to the goal-based task, the semantic-based temporal chain retriever 740 retrieves, at 725, corresponding temporal content chain. Such obtained semantically related content and the temporal content chains are stored in the content pool 750 to provide the basis for the semantic analysis.

The temporal relationship determiner 760 then processes the information in 750 to identify, at 735, temporal relations existing between the content pieces in 750. For example, if the user is doing patent validity study, the goal-based task is to determine whether any prior art patent invalidates a target patent. Then the semantic analytics needed for the task may include prior art analysis, as performed at 705. A target patent number may be provided as input given content which may be analyzed by the semantic analysis engine 720 to obtain semantics covered therein. For example, the topics and concepts disclosed in the target patent may be derived and used by the semantic-based content search engine 730 to retrieve semantically and closely related prior art documents at 715. Semantically and closely related prior art may correspond to a member of a patent family. Then the semantic-based temporal chain retriever 740 may then track the semantic related temporal information to identify, e.g., prior art member of the family and obtain a temporal chain created based on the retrieved temporal information related to the semantics of the target patent.

Based on the searched semantically related content and the semantic based temporal chains, detailed temporal relations existing between/among different prior art family members may be identified at 735. For each prior art family member, if it is in a temporal content chain with divisional and/or continuation relations, then the semantic analysis on this prior art member may be focused on the claims since the specification text are same among the parent patent and continuation and divisional applications. If the prior art member follows a chain with CIP relation, then the semantic analysis on this prior art analysis may trace back to the CIP application to identify the new matter added to the CIP and the priority date of the new matter, which may have significant impact on the validity of the target patent depending on whether the new matter was added before or after priority date of the target patent. Therefore, for each prior art family member, the type of semantic analysis may be determined at 745 based on the temporal relation existing between the prior art member and its parents, and the corresponding semantic analysis of the type may be performed at 755. If it is detected that more type of semantic analysis is needed at 765, then go to step 745 to determine the next type of semantic analysis needed and perform the corresponding analysis at 755 until no more type is needed at 765. The final semantic analysis results are aggregated and output at 755 to other function units for further processing and visualization.

Figure 8A:
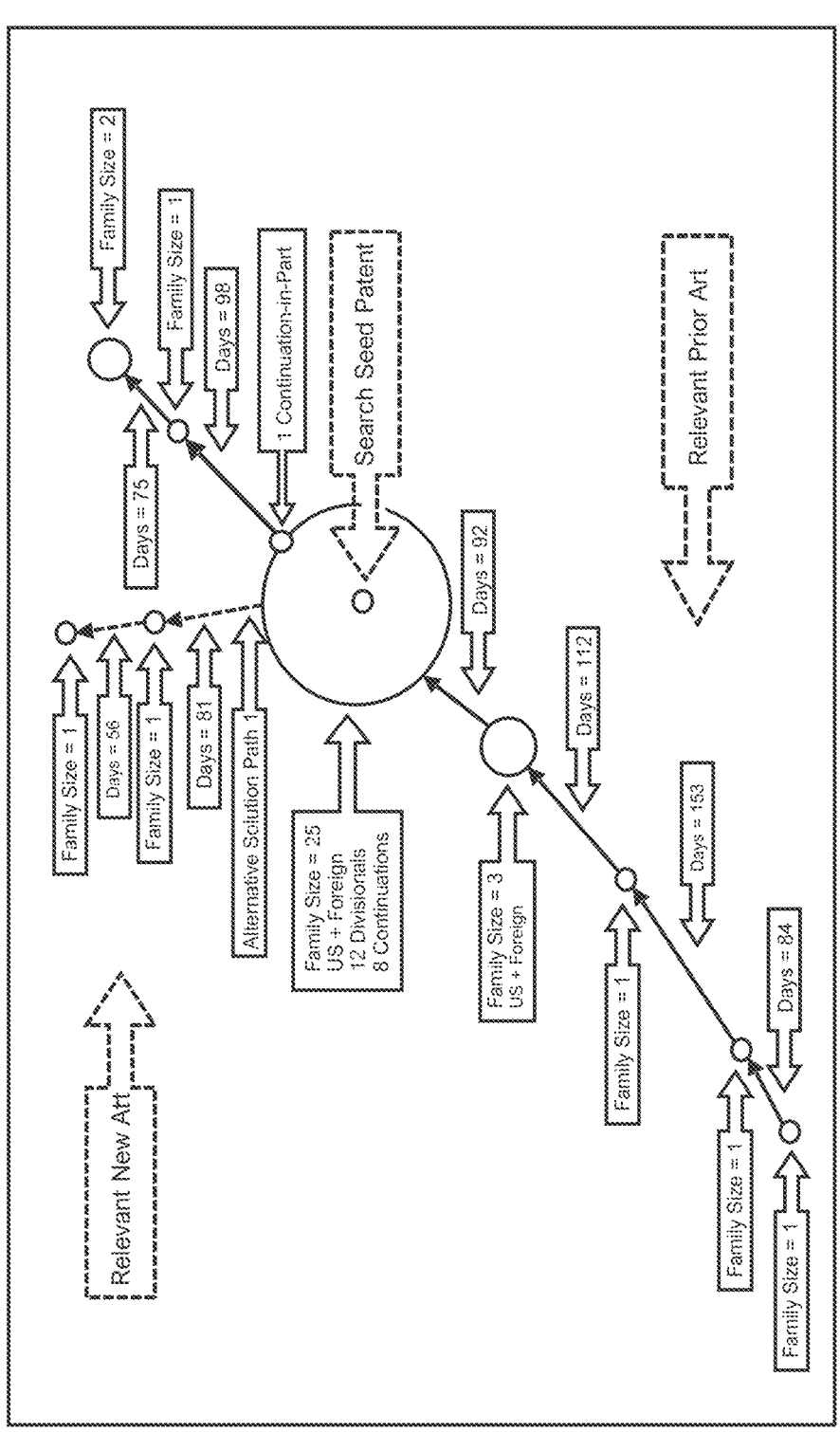
FIG. 8A illustrates an exemplary visualization of semantic and temporal relationships between patent families, in accordance with an embodiment of the present teaching.

FIG. 8A illustrates an exemplary semantic and temporal relationship path of patent families represented as nodes connected by directed links (arrows) indicating temporal progression in a graphical user interface, in accordance with an embodiment of the present teaching. Node size may be proportional to the underlying family size, and link length proportional to elapsed time, e.g., days, months, or years, with optional arrow indicating temporal sequence direction. Expressed as a large node circle, large families would not obscure relevant patents with proximate priority dates that would not be apparent in lists of individual patents. Nodes may connect without links when the priority date matches, continuations-in-part may connect to the parent node by overlapping nodes or by a specialized link such as a dotted or colored line to illustrate the later priority date of the new matter.

Graphic figures can be moved, adjusted, interrogated, expanded, and collapsed as needed. Individual nodes may be active touch points that can be used to present and navigate patents, patent links, patent lists, and patent families. For example, a node may be activated to show the whole family subgraph represented by the node, to use as seed to redraw the main paths focusing on those connected to the seed node, or to redo a search to create a new portfolio for analysis, etc. Interactive UI also provides access to patent families overlapped, intersected or placed closely due to the same or proximate priority dates by providing an enlarged subgraph of adjacent or overlapped families. The seed patent may be marked if it is part of a patent family in the displayed path. Various annotations on any patent family nodes or branches in the paths may be added automatically based on topics or other meta information of the nodes and edges, e.g., "Relevant new art" after the seed patent, "Alternative solution path", etc.

Figure 8B:
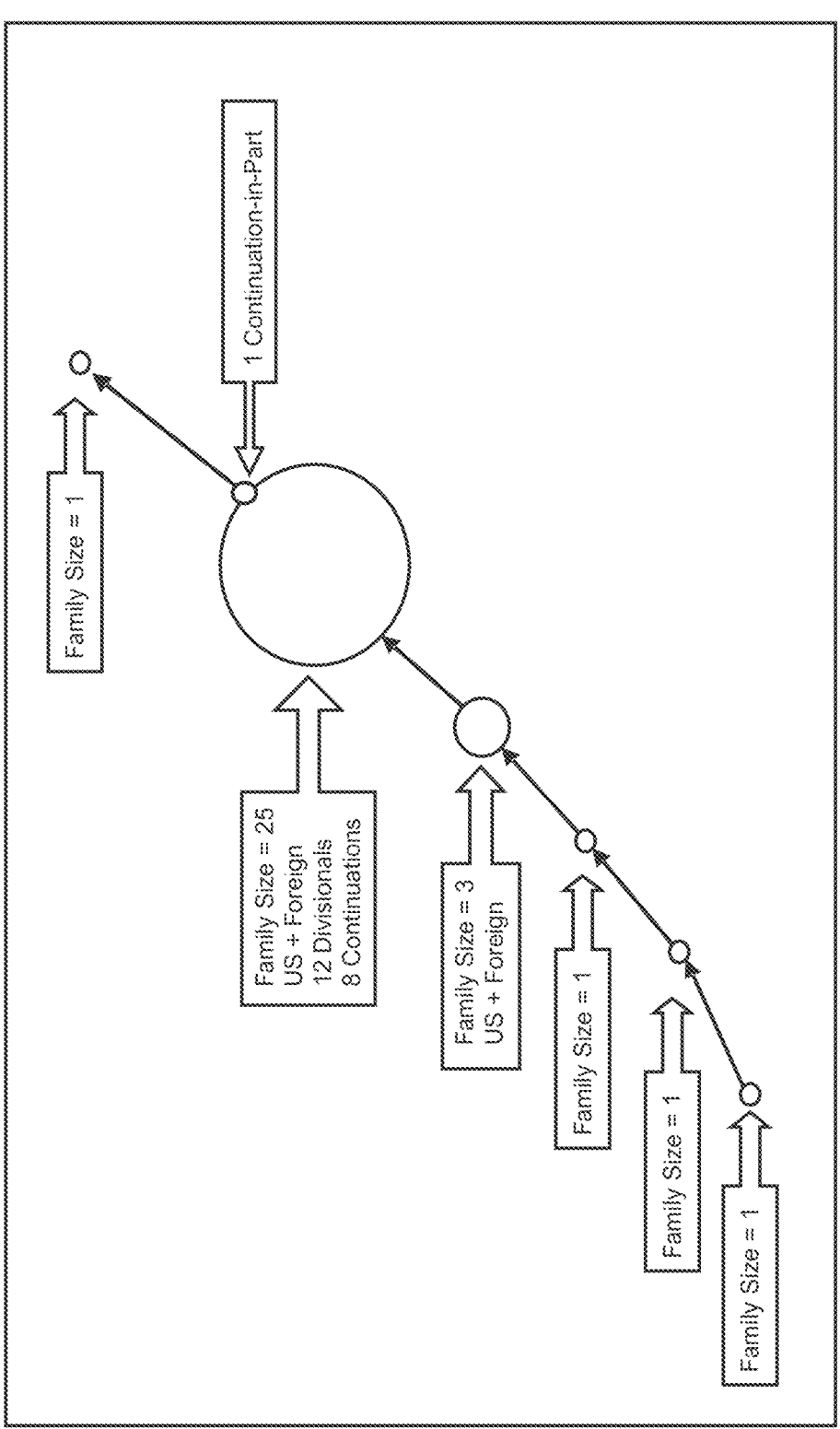
FIG. 8B illustrates an exemplary visualization of family information in an enlarged semantic and temporal relationship presentation, in accordance with an embodiment of the present teaching.

FIG. 8B illustrates an exemplary enlarged subgraph of the temporal relationship paths depicted in FIG. 8A with a focus on a large patent family with continuation-in-part applications, in accordance with an embodiment of the present teaching. The largest node circle in FIG. 8B may represent a family of 25 patent applications including US and foreign filings, 8 of which are continuations. Overlapping or intersecting nodes representing continuations-in-part may indicate amount of new matter and partially overlapping timelines. Usually, the amount of new matter in a CIP is rather small though.

Figure 8C:
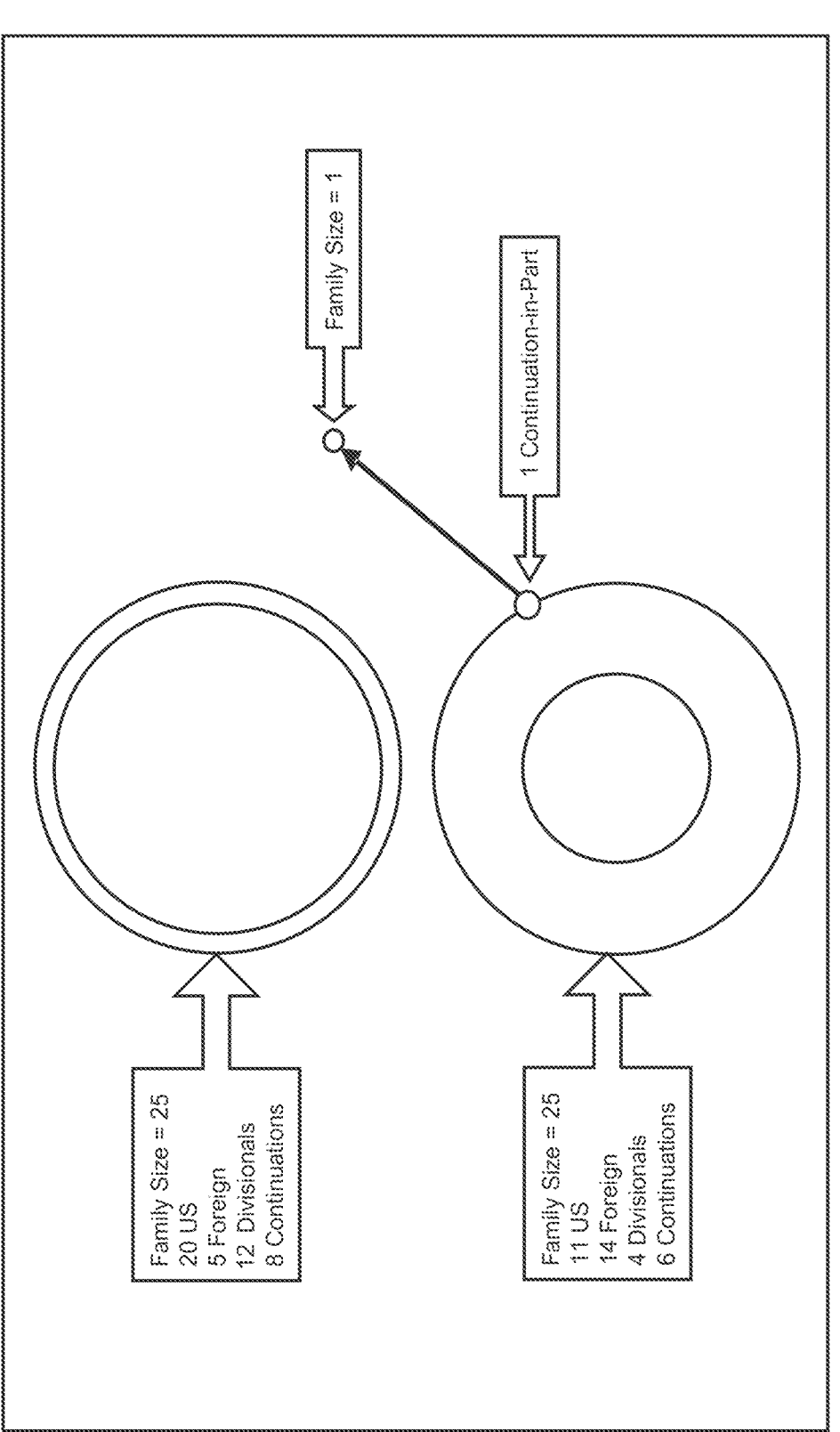
FIG. 8C illustrates exemplary visualizations reflecting international filing in a patent family, in accordance with certain embodiments of the present teaching.

FIG. 8C illustrates the ratio of family size to the jurisdictional filing range of the family of similarly sized patent families, in accordance with certain embodiments of the present teaching. US and foreign family members may be expressed as relatively sized concentric circles with the parent patent jurisdiction at the center. For example, the smaller circle may represent the number of patents in the family from the original filing authority. The larger concentric circle may represent the total number of patents in the family.

Figure 9:
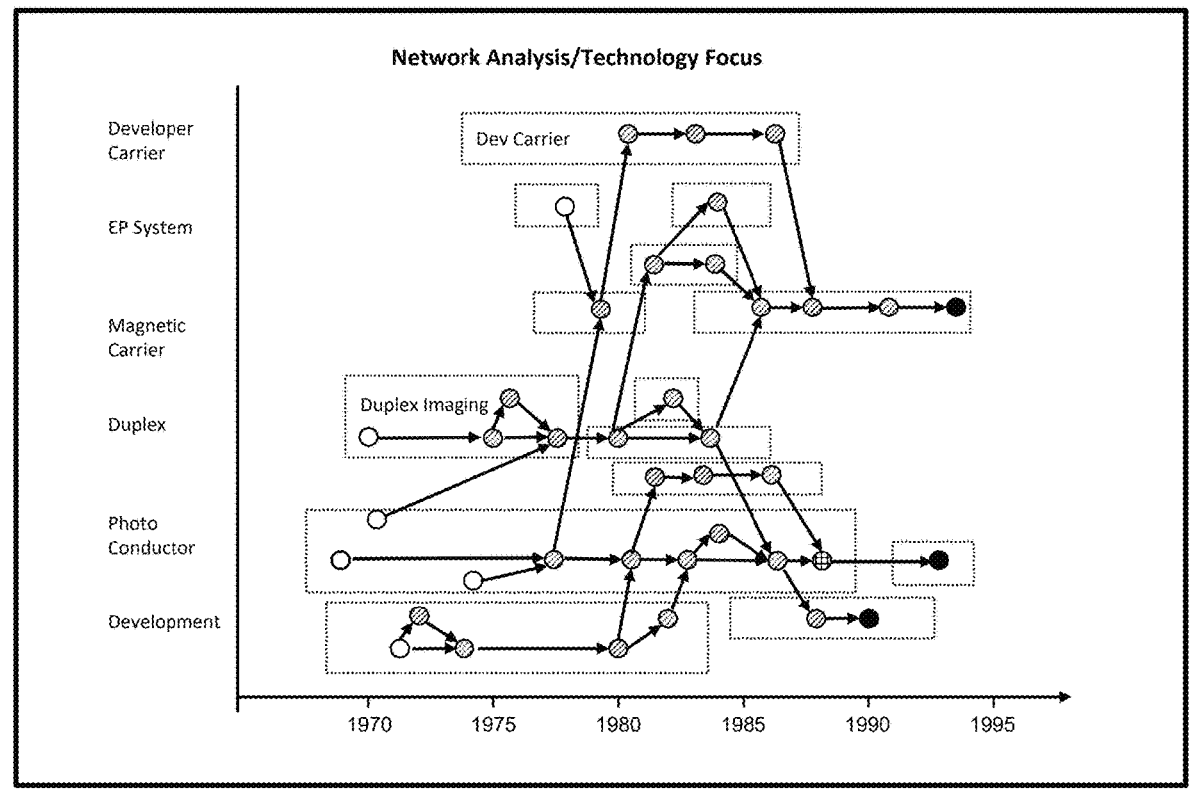
FIG. 9 illustrates an exemplary visualization of semantic and temporal relationships between patent families with technology focus, in accordance with an embodiment of the present teaching.

FIG. 9 illustrates exemplary visualization of temporal, relevance, and technical relationships between patents and multiple interconnected relationship paths focused on different aspects of the relevant technology using X and Y axis, in accordance with an embodiment of the present teaching. Multiple discrete relationship paths may be displayed in the same graphical user interface if space permits. The X axis span may be used to represent at least a selected span and progression of time and/or technical category, which can evolve and change over time, and the Y axis may represent some kind of relevance metrics defined for one or more, linked or discrete node and link relationship paths, e.g., relevance to a search target, a technical category, a selected user objective, or selected main path in a group of paths. In this embodiment, patent families may be represented as nodes in the temporal, relevance and the technical relation paths, where patent families that are source node, i.e., starting point of a path, may be represented by a circle and patent families that are sink node, i.e., the end point of a path, may be represented by a solid circle. Intermediate nodes may be represented by circles filled with different patterns based on the family statistics and/or litigation status defined for the analytics goal. Color, shape, shade, pattern, and other visualization tools may be applied to show specific information of a node, e.g., the bibliographic information and/or the temporal and semantic analytics results of the patent family. Patent families of the same technology may be marked, e.g., using a labeled box with dotted outline, or shaded area to show the change or progression clearly.

Figure 10:
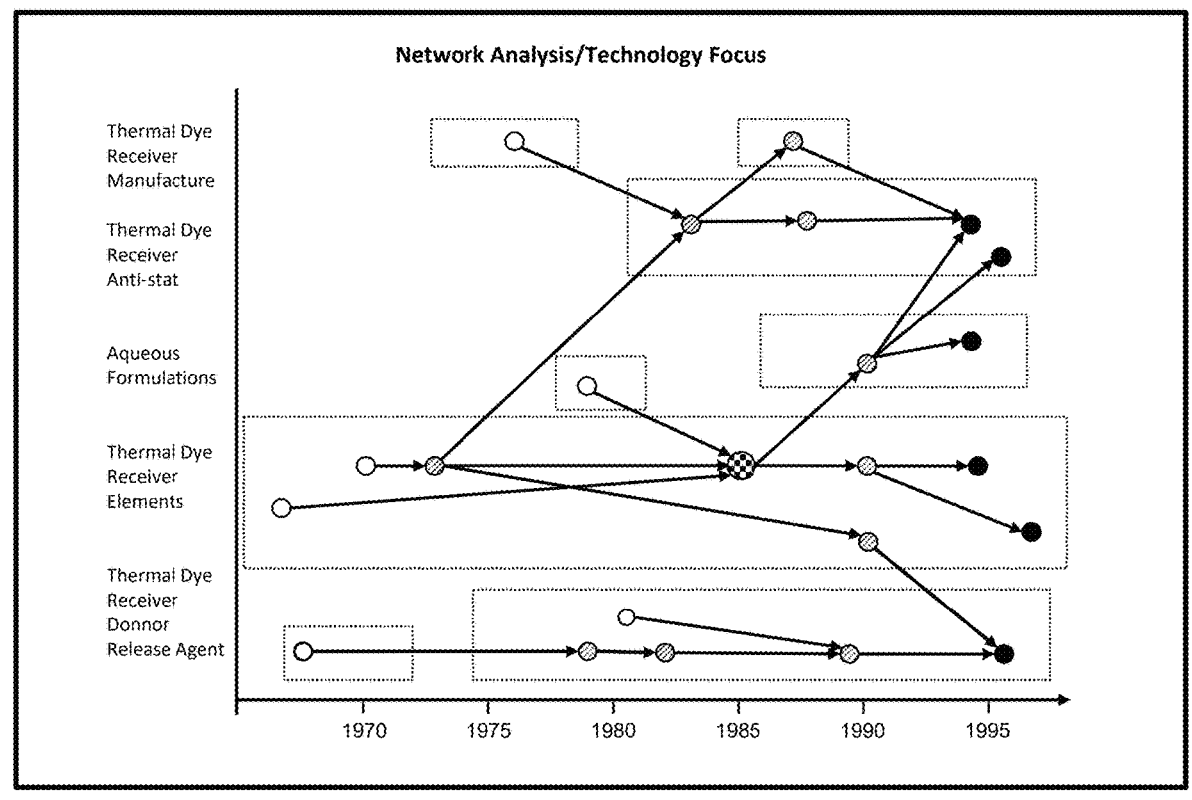
FIG. 10 illustrates another exemplary visualization of semantic and temporal relationships between patent families with technology focus, in accordance with an embodiment of the present teaching.

FIG. 10 illustrates another exemplary visualization of semantic and temporal relationships between patent families with different technology focus using X and Y axis, in accordance with an embodiment of the present teaching. Nodes may dynamically expand and contract to reveal underlying lists of patents, and patent family links. For example, nodes with expandable information may be indicated by a bigger and noticeably different circle. In addition, hover-over type popups provide other information such as, enforceability status, assignees, automatically created analytics summary, text synopsis and/or keywords and phrases, class codes, or any other information related to the patent, patent family, or group of patents on the similar technology marked by a box of dotted outline.

Figure 11:
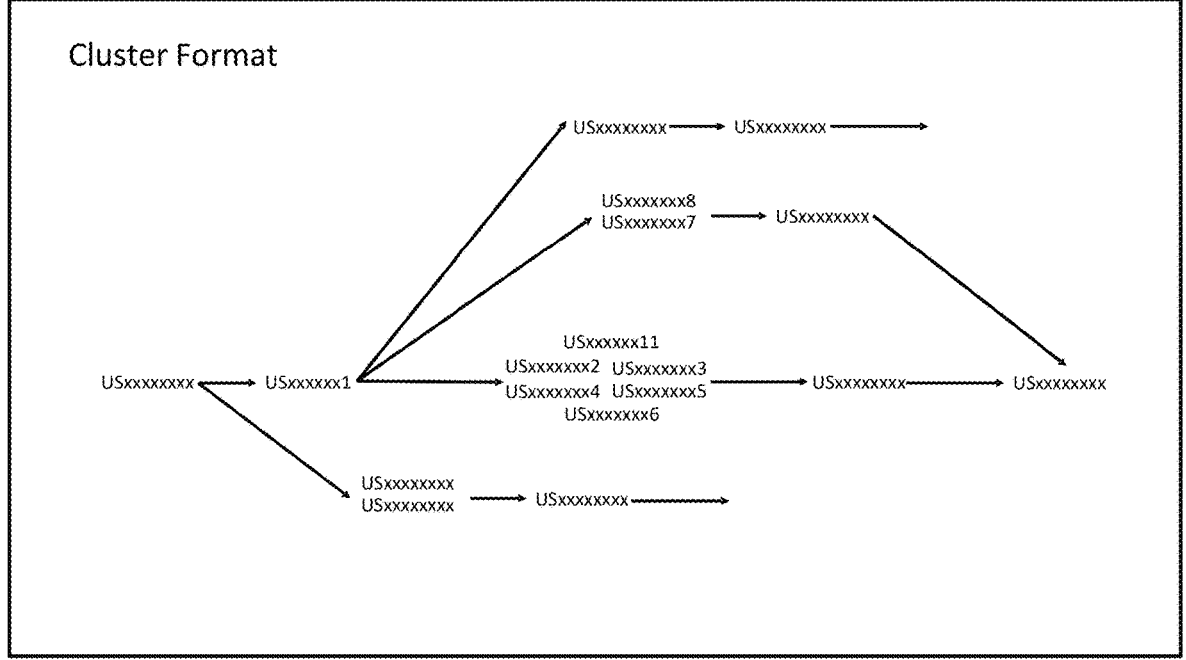
FIG. 11 illustrates an exemplary visualization of temporal relationships between patent families with cluster representation, in accordance with an embodiment of the present teaching.

FIG. 11 illustrates an exemplary visualization of temporal relationships between patent families with cluster representation, in accordance with an embodiment of the present teaching. Cluster representation may be used for nodes where the underlying patent families have same or proximate priority dates in the family based graph representation, or for representing family members since all continuations and divisionals have the same priority date.

Figure 12:
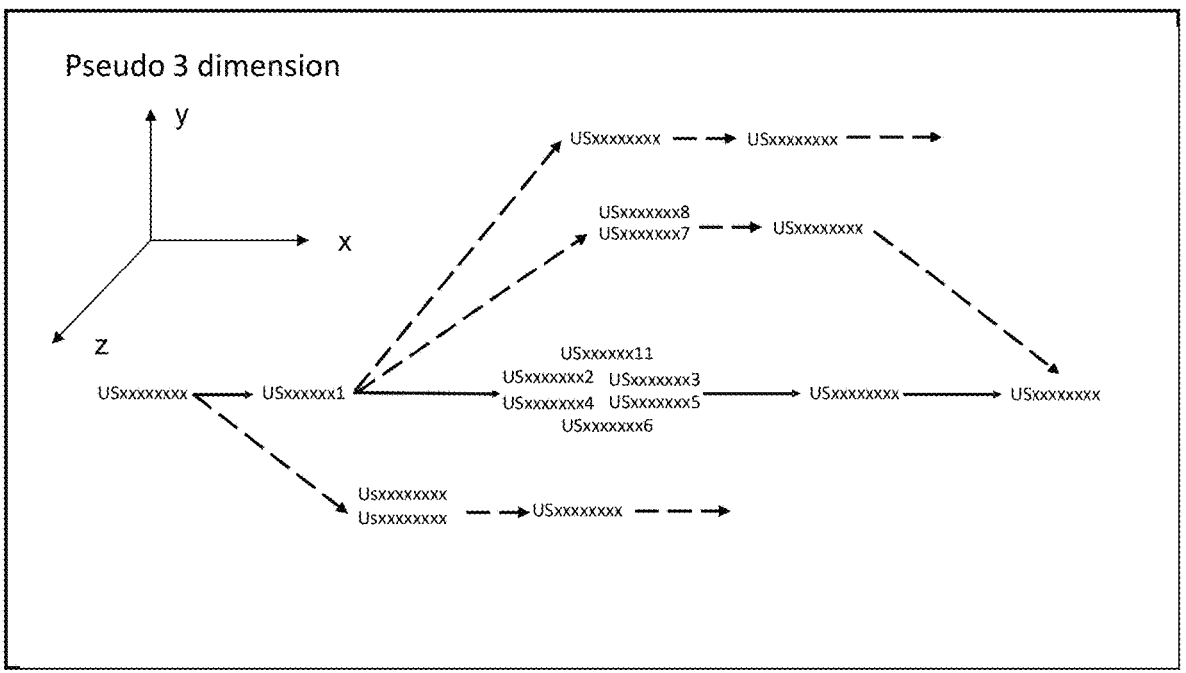
FIG. 12 illustrates an exemplary visualization of temporal relationships between patent families with pseudo 3 dimension representation, in accordance with an embodiment of the present teaching.

FIG. 12 illustrates exemplary visualization of temporal relationships between patent families with pseudo 3 dimension representation, in accordance with an embodiment of the present teaching. Temporal relationship paths, especially those that have links crossing or interfering with the paths that the user is interacting with, may be deactivated or greyed out as background (illustrated as dot lines) to improve visibility. For example, the user interaction interface may be configured to light up only the path that the user is interacting with, or configured to provide some stickiness that allow user to keep explored paths in the foreground until deactivated by the user, etc. Multiple documents in a path that occur at the same time or closely in time, may be placed along the Z axis using a time based sequence order, e.g., application ID, to improve visibility.

Figure 13:
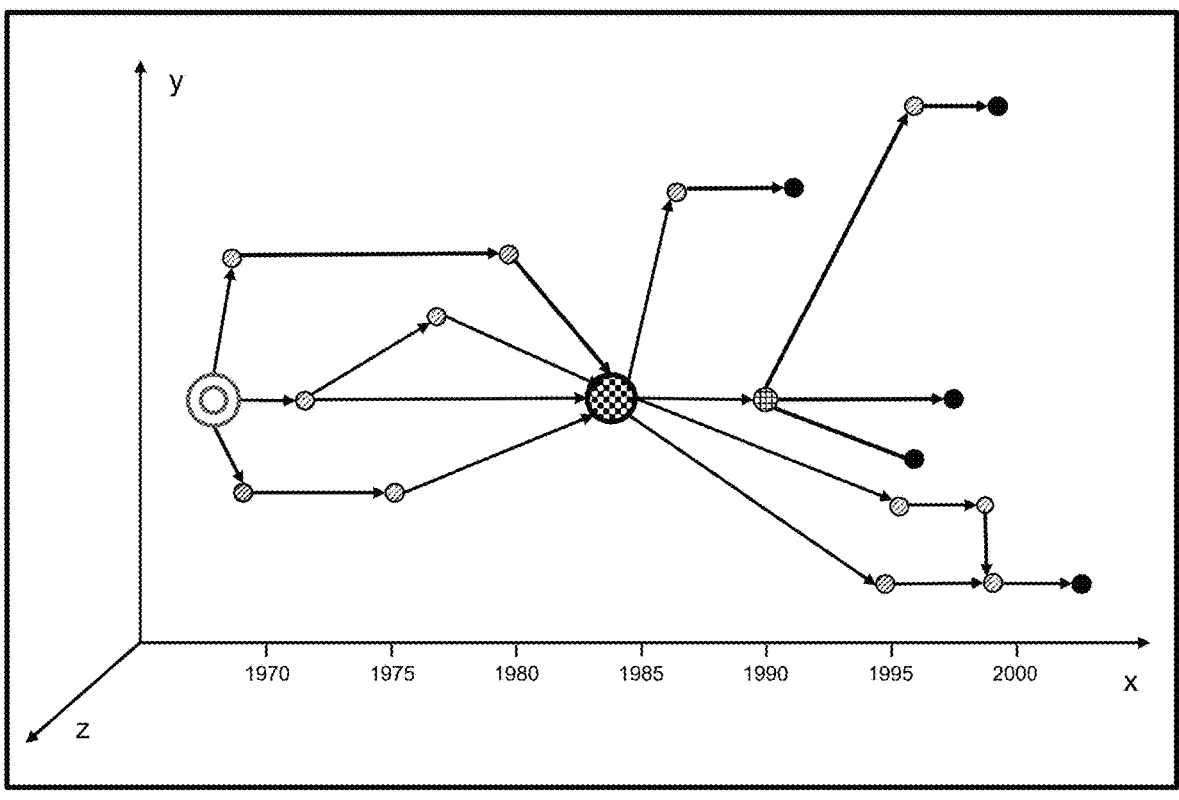
FIG. 13 illustrates an exemplary visualization of semantic and temporal relationships between patent families with information represented by color and shape, in accordance with an embodiment of the present teaching.

FIG. 13 illustrates exemplary visualization of semantic and temporal relationships between patent families with information represented by pattern and shape, in accordance with an embodiment of the present teaching. Color, shade, and other visualization tools may be used to achieve the similar effects. The pattern of nodes may be set up based on the relevance of the node to the query, and shape may be added to the node with distinct pattern when one or more family members were litigated. The pattern and thickness of the link may be used to represent the relevance level of the temporal relationship. The relevance level of citation and sequence relationships may be defined as follows from least relevant to most relevant represented by different color:

Type 0: Citation by inventor self
Type 1: Citation by other inventor
Type 2: Citation by examiner
Type 3: Continuation-in-part
Type 4: Divisional
Type 5: Continuation
Type 6: Reissue/EP national/WO national
Type 7: Provisional
Type 3-7 are actually relationships between family members which may not be shown in the initial graph if it is family based, but in a family subgraph instead. Type 0 relationship may be represented as dot line with arrow, but often ignored for certain analytics goals when third party opinion is more important than the author. Type 1 relationship may be represented as thinner line with arrow as illustrated in FIG. 13, and type 2 as thicker line with arrow. Type 3-7 may be represented as different patterns of lines to distinguish from the citation relationships. There may be more than one citation relationship that exists between two families, e.g., citation by inventor self and by examiner of different family members. Which one to use depends on the analytics goal. Nodes may be labeled with a representative patent from the underlying family that may be selected based relevance, litigation, or other meta information depending on the analytics goal. Seminal patents or patents with big impact that are identified for certain analytics goals, e.g., intelligence or M&A, may be marked as bigger double circles and pattern filled thick circles respectively to distinguish from others. Patents owned by potential NPE may be marked with different pattern. Again, color, shade and other visualization tools may be applied to distinguish significant nodes depending on the analytic goals.

Figure 14:
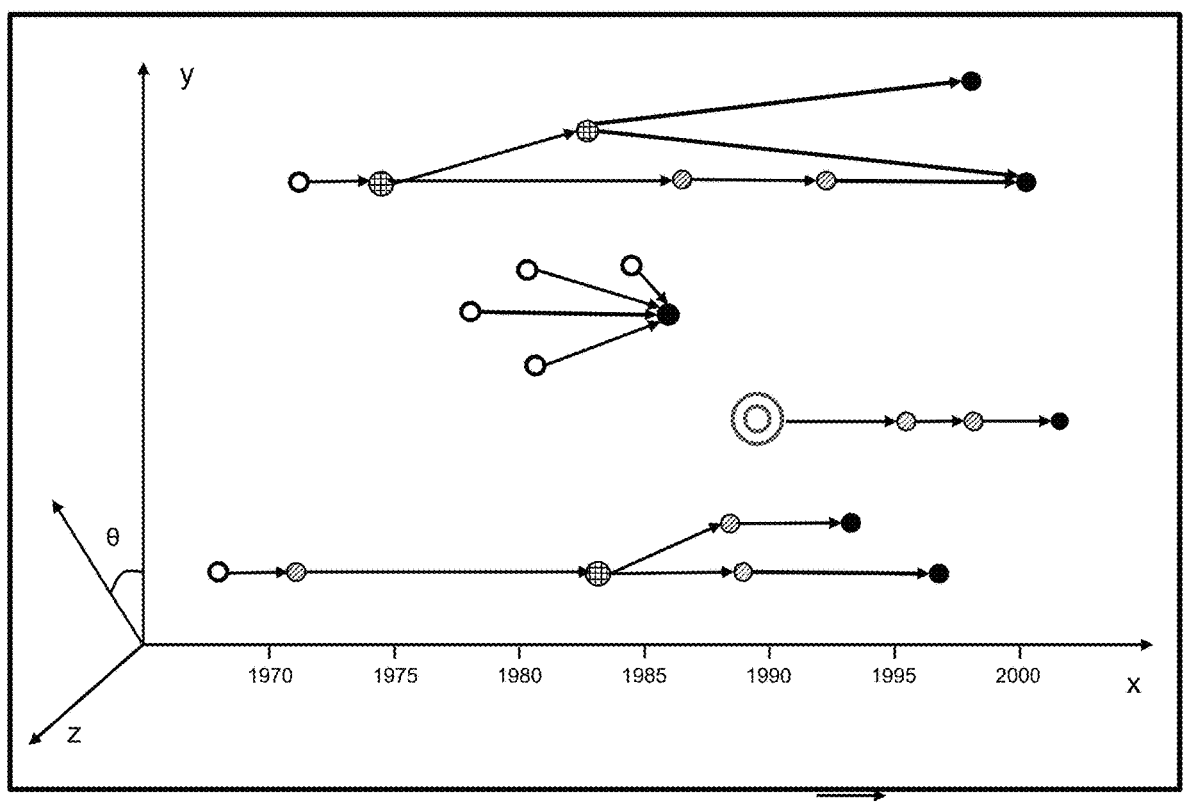
FIG. 14 illustrates an exemplary visualization of multiple groups of semantic and temporal relationships among patent families with information represented by color and shape, in accordance with an embodiment of the present teaching.

FIG. 14 illustrates an exemplary visualization of multiple groups of semantic and temporal relationships among patent families with information represented by pattern and shape, in accordance with an embodiment of the present teaching. Multiple discrete groups of interconnected paths may be stacked on top of each other based on certain criteria, e.g., relevance, length of path, start time, etc., in a 2D visual space or in a 3D visual space, where Y-Z plane may be used to project each group based on the cosine similarity angle between the group and the central group of paths. In the exemplary graph, a seminal technology (illustrated as double circle) occurred close to the end of other technology lines, which may contribute to the ending of those technologies, therefore, it may be selected as the central group. Other groups of paths may be positioned in the Y-Z plane based on the cosine similarity angle with regard to the central group.

Figure 15:
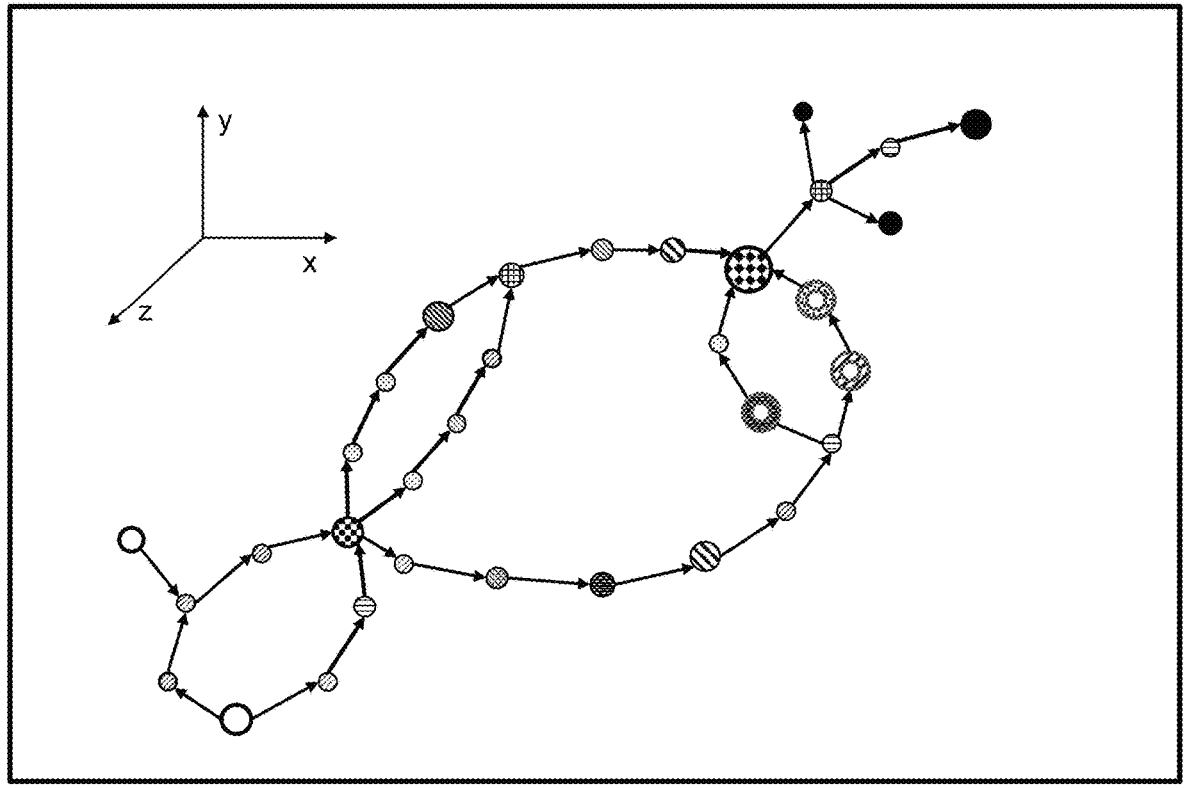
FIG. 15 illustrates an exemplary visualization of semantic and implicit temporal relationships between patent families with information represented by color and shape, in accordance with an embodiment of the present teaching.

FIG. 15 illustrates an exemplary visualization of semantic and implicit temporal relationships between patent families with information represented by pattern and shape, in accordance with an embodiment of the present teaching. Graphic figures can be moved and adjusted, rotated in 2D or 3D space, interrogated, expanded, and collapsed. Additional details and information may be provided to nodes and edges depending on the user interaction and analytics goals. The arrows indicate temporal progression between the nodes in each path. In this embodiment, the length of the link may or may not tie to the time span between the nodes. Source nodes and sink nodes may be represented by specific patterns such as circle and solid circle respectively. Large families may be represented by a larger circle. Families with litigated patents may be represented as double circles filled with patterns, which may indicate other information, e.g., NPE, global protection, etc.

Figure 16:
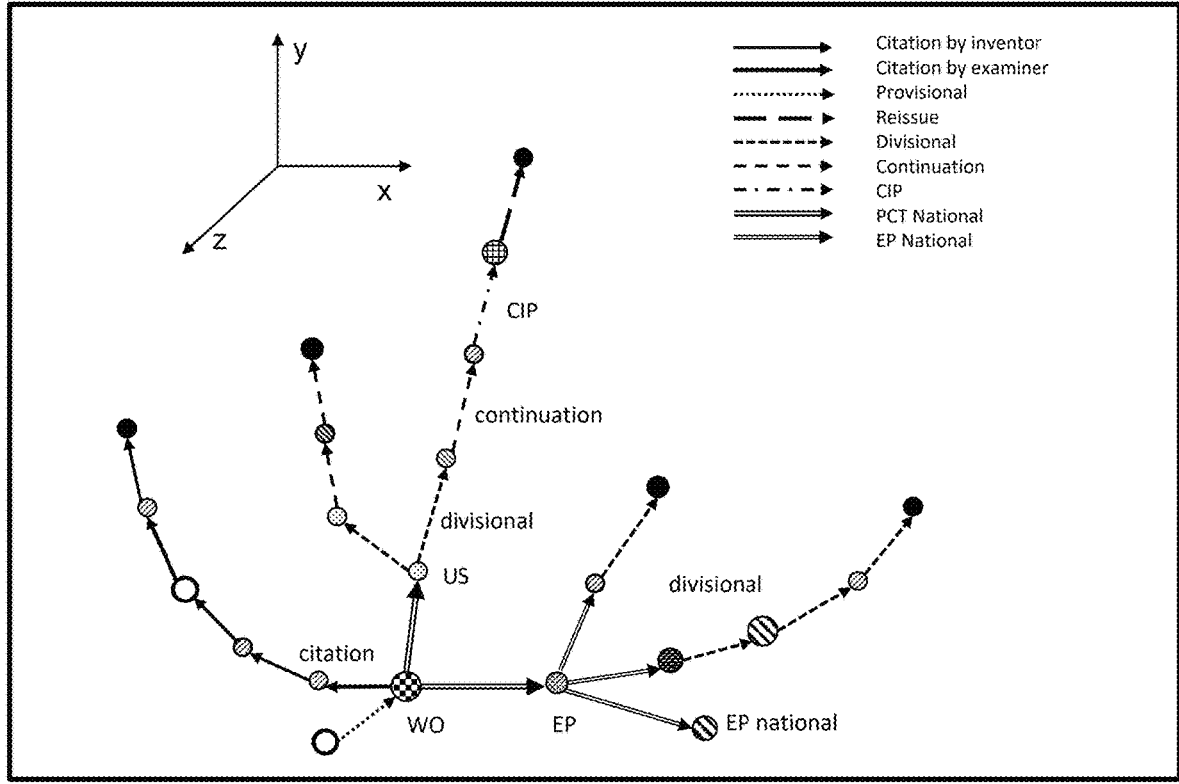
FIG. 16 illustrates an exemplary visualization of semantic and implicit temporal relationships between patents with different citation and sequence types represented by color and shape, in accordance with an embodiment of the present teaching.

FIG. 16 illustrates an exemplary visualization of semantic and implicit temporal relationships between patents with different citation and sequence types represented by pattern and shape, in accordance with an embodiment of the present teaching. Type 3 continuation-in-part may be represented as dash dot line and type 5 continuation as dash line to distinguish from type 1 inventor and type 2 examiner citations represented as solid line with different thickness. PCT national and EP national may be represented as thicker and thinner double line respectively, while provisional, reissue and divisional may be represented by dot line, long dash line, and square dot line respectively. Color, shade, and other visualization tools may be applied to highlight the differences between relationships.

Figure 17:
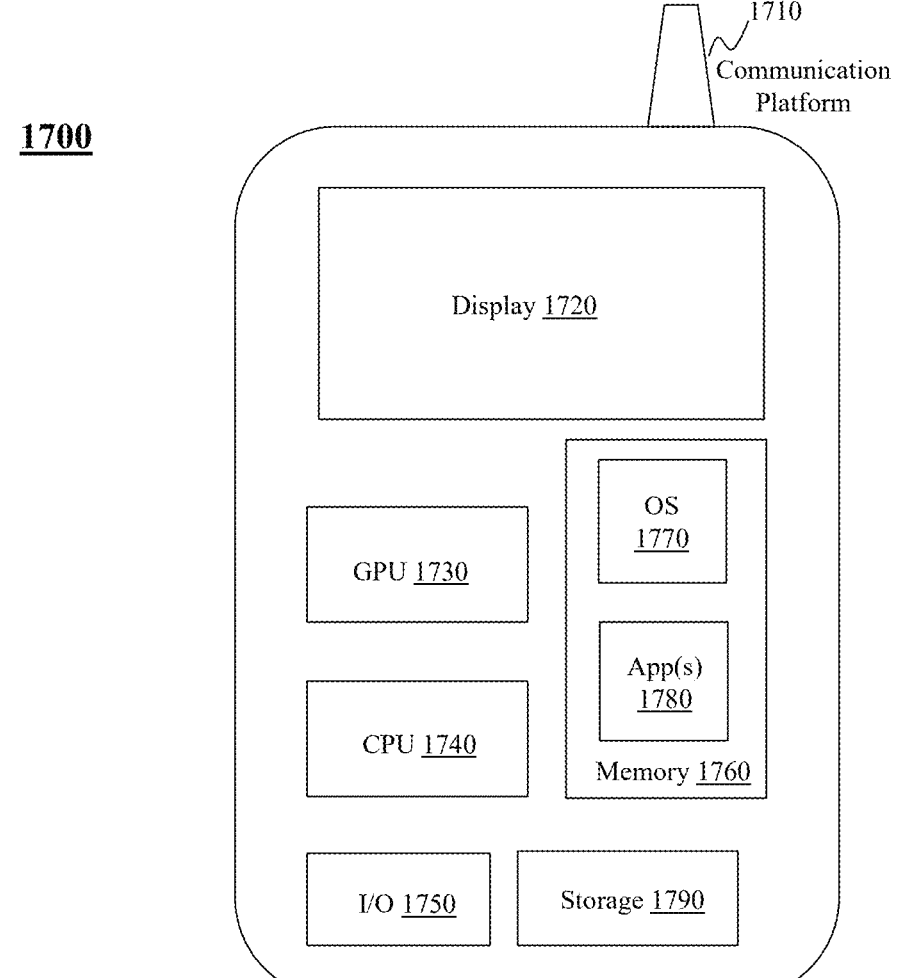
FIG. 17 is an illustrative diagram of an exemplary mobile device architecture that may be used to realize a specialized system implementing the present teaching in accordance with various embodiments.

FIG. 17 is an illustrative diagram of an exemplary mobile device architecture that may be used to realize a specialized system implementing the method of content and temporal relationship analytics as disclosed in the present teaching in accordance with various embodiments. In this example, a device on which the present teaching is implemented corresponds to a mobile device 1700, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 1700 may include one or more central processing units ("CPUs") 1740, one or more graphic processing units ("GPUs") 1730, a display 1720, a memory 1760, a communication platform 1710, such as a wireless communication module, storage 1790, and one or more input/output (I/O) devices 1750. Any other suitable component, including but not limited to a system bus or a controller (not shown), may also be included in the mobile device 1700. As shown in FIG. 17 a mobile operating system 1770 (e.g., iOS, Android, Windows Phone, etc.), and one or more applications 1780 may be loaded into memory 1760 from storage 1790 in order to be executed by the CPU 1740. The applications 1780 may include suitable mobile apps for managing the tasks related to the present teaching on mobile device 1700. User interactions may be achieved via the I/O devices 1740.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement may be a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 18:
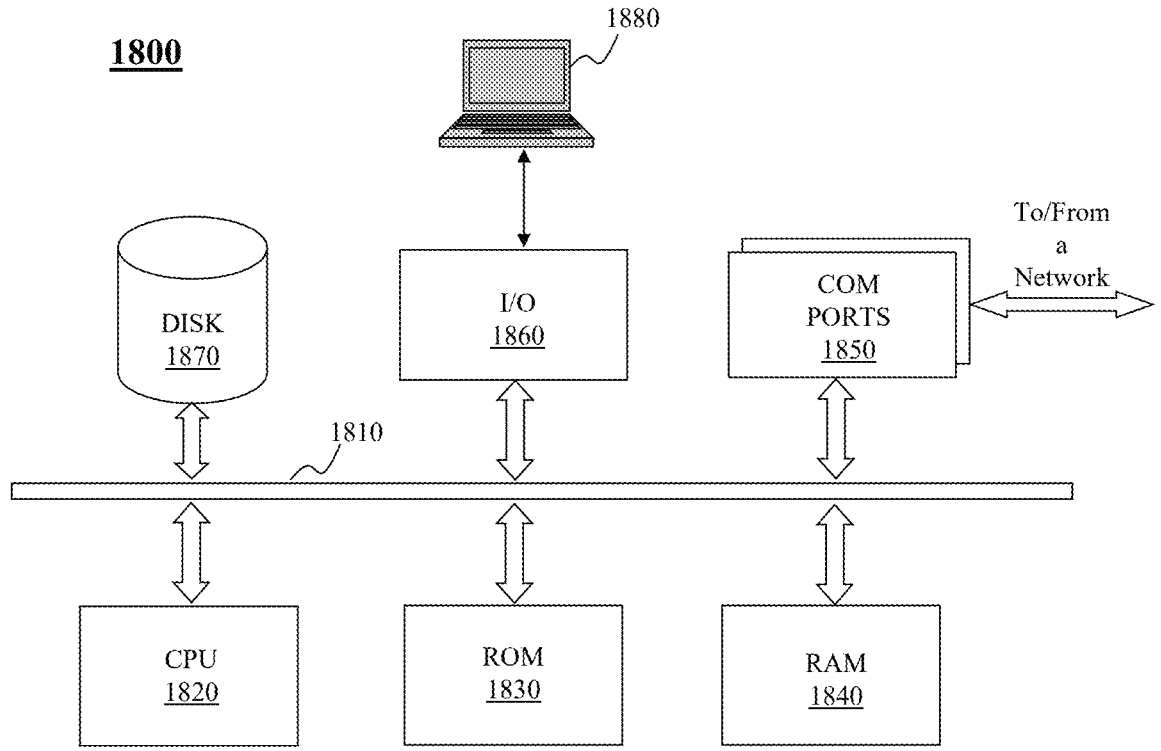
FIG. 18 is an illustrative diagram of an exemplary computing device architecture that may be used to realize a specialized system implementing the present teaching in accordance with various embodiments.

FIG. 18 is an illustrative diagram of an exemplary computing device architecture that may be used to realize a specialized system implementing various functionalities related to the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer may be used to implement any component of conversation or dialogue management system, as described herein. For example, various functions associated with the present teaching may be implemented on a computer such as computer 1800, via its hardware, software program, firmware, or a combination thereof. Although only one such computer is shown, for convenience, the computer functions relating to the conversation management system as described herein may be implemented in a distributed fashion on a number of similar platforms, to distribute the processing load.

Computer 1800, for example, includes COM ports 1850 connected to and from a network connected thereto to facilitate data communications. Computer 1800 also includes a central processing unit (CPU) 1820, in the form of one or more processors, for executing program instructions. The exemplary computer platform includes an internal communication bus 1810, program storage and data storage of different forms (e.g., disk 1870, read only memory (ROM) 1830, or random access memory (RAM) 1840), for various data files to be processed and/or communicated by computer 1800, as well as possibly program instructions to be executed by CPU 1820. Computer 1800 also includes an I/O component 1860, supporting input/output flows between the computer and other components therein such as user interface elements 1880. Computer 1800 may also receive programming and data via network communications.

Hence, aspects of the methods of dialogue management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with conversation management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the network detection techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method comprising:

receiving, from a user, an input specifying one of multiple different goals;

searching initial content with respect to the specified goal;

performing semantics analysis on the initial content to determine semantics with respect to the specified goal;

obtaining associated content relating to the initial content, wherein the associated content includes additional semantically related content identified based on the semantics of the content, and semantic-based temporal information;

analyzing the initial content and the associated content to identify one or more temporal relations between different pieces of content with the initial content and the associated content;

with respect to each of the one or more temporal relations, determining one of multiple different types of semantic analysis with respect to the specified goal based on the temporal relation, wherein the different types of semantic analysis are provided for achieving multiple different goals and are applied to analyze respective portions of the initial content determined with respect to each of the multiple different goals, carrying out the type of semantic analysis determined based on the temporal relation;

generating a summary for each of the semantic analyses based on one or more metrics computed therefor;

visualizing the summary for each of the semantic analyses to visually present to the user the content in at least some of the groups in terms of the specified goal and linked based on the one or more temporal relations; and dynamically adjusting the visualization based on an input received from the user.

2. The method of claim 1, wherein the specified goal includes at least one of:

a first goal relates to obtaining knowledge regarding intellectual properties (IP) associated with some specified target and relationship among different pieces of the IP;

a second goal relates to gathering publicly available information associated with an academic field; and a third goal relates to revealing survey information associated with questionaries directed to a study.

3. The method of claim 2, wherein the specified target includes one or more of a business entity;

an individual;

a product;

a technological field; and a textual description.

4. The method of claim 1, wherein the associated content includes:

temporally related content linked to the initial content based on some temporal relationship defined according to a first criterion; and semantically related content linked to the initial content based on some semantic relationship defined according to a second criterion.

5. The method of claim 1, wherein the content includes one or more groups of content, which includes at least one of:

one or more semantic groups, each of which comprises multiple pieces of the content that are semantically similar according to some pre-defined semantic-relevant criterion;

one or more groups of temporally relevant content, each of which comprises multiple pieces of the content that are temporally associated according to some pre-defined temporal relationship; and one or more temporally associated semantically relevant groups, each of which comprises multiple pieces of the content that are semantically similar and temporally associated.

6. The method of claim 4, wherein the temporal relationship includes at least one of:

an event-based temporal relationship; and a reference-based temporal relationship.

7. The method of claim 6, wherein the event-based temporal relationship is defined based on a temporal sequence of events of at least one pre-defined type occurred over time.

8. The method of claim 7, wherein the at least one pre-defined type of event includes:

submission of a document with a modified portion as compared with an original version of the document; and submission of a document already submitted to a first source to a different source.

9. The method of claim 6, wherein the reference-based temporal relationship is defined based on an action carried out over time.

10. The method of claim 9, wherein the action includes at least one of a citation and a reference to another document.

11. The method of claim 1, wherein the summary for each of the semantic analyses comprises:

one or more statistics characterizing group content included in the group; and a representation of connections among the multiple pieces of content included in the group.

12. A machine readable and non-transitory medium having information recorded thereon, wherein the information, when read by the machine, causes the machine to perform the following steps:

receiving, from a user, an input specifying one of multiple different goals;

searching initial content with respect to the specified goal;

performing semantics analysis on the initial content to determine semantics with respect to the specified goal;

obtaining associated content relating to the initial content, wherein the associated content includes additional semantically related content identified based on the semantics of the content, and semantic-based temporal information;

analyzing the initial content and the associated content to identify one or more temporal relations between different pieces of content with the initial content and the associated content;

with respect to each of the one or more temporal relations, determining one of multiple different types of semantic analysis with respect to the specified goal based on the temporal relation, wherein the different types of semantic analysis are provided for achieving multiple different goals and are applied to analyze respective portions of the initial content determined with respect to each of the multiple different goals, carrying out the type of semantic analysis determined based on the temporal relation;

generating a summary for each of the semantic analyses based on one or more metrics computed therefor;

visualizing the summary for each of the semantic analyses to visually present to the user the content in at least some of the groups in terms of the specified goal and linked based on the one or more temporal relations; and dynamically adjusting the visualization based on an input received from the user.

13. The medium of claim 12, wherein the specified goal includes at least one of:

a first goal relates to obtaining knowledge regarding intellectual properties (IP) associated with some specified target and relationship among different pieces of the IP;

a second goal relates to gathering publicly available information associated with an academic field; and a third goal relates to revealing survey information associated with questionaries directed to a study.

14. The medium of claim 13, wherein the specified target includes one or more of a business entity;

an individual;

a product;

a technological field; and a textual description.

15. The medium of claim 12, wherein the associated content includes:

temporally related content linked to the initial content based on some temporal relationship defined according to a first criterion; and semantically related content linked to the initial content based on some semantic relationship defined according to a second criterion.

16. The medium of claim 12, wherein the content includes one or more groups of content, which includes at least one of:

one or more semantic groups, each of which comprises multiple pieces of the content that are semantically similar according to some pre-defined semantic-relevant criterion;

one or more groups of temporally relevant content, each of which comprises multiple pieces of the content that are temporally associated according to some pre-defined temporal relationship; and one or more temporally associated semantically relevant groups, each of which comprises multiple pieces of the content that are semantically similar and temporally associated.

17. The method of claim 15, wherein the temporal relationship includes at least one of:

an event-based temporal relationship; and a reference-based temporal relationship.

18. The medium of claim 17, wherein the event-based temporal relationship is defined based on a temporal sequence of events of at least one pre-defined type occurred over time.

19. The medium of claim 18, wherein the at least one pre-defined type of event includes:

submission of a document with a modified portion as compared with an original version of the document; and submission of a document already submitted to a first source to a different source.

20. The medium of claim 17, wherein the reference-based temporal relationship is defined based on an action carried out over time.

21. The medium of claim 20, wherein the action includes at least one of a citation and a reference to another document.

22. The medium of claim 12, wherein the summary for each of the semantic analyses comprises:

one or more statistics characterizing group content included in the group; and a representation of connections among the multiple pieces of content included in the group.

* * * * *